United States Patent
Kojima et al.

(10) Patent No.: US 8,547,486 B2
(45) Date of Patent: Oct. 1, 2013

(54) LIQUID CRYSTAL SHUTTER AND DISPLAY SYSTEM USING THE SAME

(75) Inventors: Tetsuya Kojima, Ishikawa-ken (JP); Toshiyuki Higano, Ishikawa-ken (JP); Shigesumi Araki, Toyama-ken (JP); Tetsuo Fukami, Ishikawa-ken (JP); Kazuhiro Nishiyama, Ishikawa-ken (JP)

(73) Assignee: Japan Display Central Inc., Fukaya-shi (JP)

( * ) Notice: Subject to any disclaimer, the term of this patent is extended or adjusted under 35 U.S.C. 154(b) by 571 days.

(21) Appl. No.: 12/772,465

(22) Filed: May 3, 2010

(65) Prior Publication Data
US 2011/0080535 A1    Apr. 7, 2011

(30) Foreign Application Priority Data
Oct. 7, 2009   (JP) .................................. 2009-233711

(51) Int. Cl.
*G02F 1/1335*   (2006.01)
(52) U.S. Cl.
USPC ................. 349/13; 349/16; 349/193
(58) Field of Classification Search
USPC ............................. 349/13, 16, 193
See application file for complete search history.

(56) References Cited

U.S. PATENT DOCUMENTS

| | | | | |
|---|---|---|---|---|
| 5,699,133 | A | * | 12/1997 | Furuta ............................. 349/13 |
| 2006/0098149 | A1 | * | 5/2006 | Kim .............................. 349/138 |
| 2011/0122054 | A1 | * | 5/2011 | Shimizu et al. ................. 345/87 |

FOREIGN PATENT DOCUMENTS

| | | |
|---|---|---|
| JP | 2005-326843 | 11/2005 |
| JP | 2008046605 A * | 2/2008 |
| WO | WO 2010018728 A1 * | 2/2010 |

* cited by examiner

*Primary Examiner* — Michael Caley
(74) *Attorney, Agent, or Firm* — Oblon, Spivak, McClelland, Maier & Neustadt, L.L.P.

(57) ABSTRACT

A liquid crystal shutter includes a first support substrate having a first electrode and a second support substrate having a second electrode opposite to the first electrode. A liquid crystal layer is sandwiched between the first and second electrodes so as to have a switching region. The switching region becomes a bend alignment state from a splay alignment state when a voltage is applied to the liquid crystal layer. A nucleus region formation portion is arranged on the first support substrate to form a nucleus region in the switching region corresponding to the nucleus region formation portion in the liquid crystal layer, in which the splay alignment is more stable than in the switching region.

20 Claims, 12 Drawing Sheets

LIQUID CRYSTAL SHUTTER AND DISPLAY SYSTEM USING THE SAME

CROSS-REFERENCE TO RELATED APPLICATION

This application is based upon and claims the benefit of priority from prior Japanese Patent Application No. 2009-233711, filed Oct. 7, 2009, and the entire contents of which are incorporated herein by reference.

BACKGROUND OF THE INVENTION

1. Field of the Invention

The present invention relates to a liquid crystal shutter, more particularly to a liquid crystal shutter using an optically compensated bend (OCB) mode.

2. Description of the Background Art

The liquid crystal technology widely put in practical use by a display is also applied to various kinds of shutters, such as a window capable of adjusting transmissivity and a pair of glasses capable of controlling transmissivity and light blocking effect, by electric signals.

The liquid crystal is used for the shutter having high-speed response characteristics, which shows parallax images for right and left eyes by time sharing, respectively in a three dimensional display system. Recently, the shutter has been used in commercial base for the fields, such as amusement, education, broadcast, and medical treatment.

For example, Japanese Patent Application Laid-Open No. P 1996-327961 discloses the three dimensional display system using the liquid crystal shutter glasses, which has regions for right and left eyes. Although a twisted nematic (TN) type liquid crystal, a super twisted nematic (STN) type liquid crystal, and a ferroelectric liquid crystal are introduced to make the liquid crystal shutter, the liquid crystal of the TN type or the STN type has insufficient response speed. Moreover, although the ferroelectric liquid crystal has superior characteristics such as high speed response, the ferroelectric liquid crystal requires an improvement in reliability, such as shocking-proof and temperature characteristics.

On the other hand, an OCB (Optically Compensated Bend) liquid crystal using π cell is proposed. In the OCB mode, since a bend alignment of the liquid crystal is used, a high-speed response suitable for a liquid crystal shutter is obtained. Furthermore, there is also no problem of reliability, such as shocking-proof and temperature characteristics because the nematic liquid crystal is used.

In the OCB mode, at the time of power supply ON, the liquid crystal is transferred once to the bend alignment from an original splay alignment. After the liquid crystal is operated, the liquid crystal returns from the bend alignment state to the splay alignment state at the time of power supply OFF. If the transition of the alignment of the liquid crystal is made unevenly, the region where the alignment is different from other regions may be visible as spot-like unevenness. Accordingly, the quality of the liquid crystal shutter deteriorates. Since external force such as an electric signal is not applied at the time of power supply OFF, it is difficult to control the transition of the alignment.

BRIEF SUMMARY OF THE INVENTION

According to one aspect of the invention, a liquid crystal shutter includes a first support substrate having a first electrode formed thereon; a second support substrate having a second electrode formed thereon so as to oppose to the first electrode; a liquid crystal layer sandwiched between the first and second electrodes and having a switching region; the switching region becoming a bend alignment state from a splay alignment state by applying a voltage; and a nucleus region formation portion arranged on the first support substrate to form a nucleus region in the switching region corresponding to the nucleus region formation portion in the liquid crystal layer, wherein the splay alignment in the nucleus region is more stable than in the switching region.

According to another aspect of the invention, a display system including a display unit; and a liquid crystal shutter having first and second shutters each including; a first support substrate having a first electrode formed thereon; a second support substrate having a second electrode formed thereon so as to oppose to the first electrode; a liquid crystal layer sandwiched between the first and second electrodes and having a switching region; the switching region becoming a splay alignment state by applying a first voltage and a bend alignment state by applying a second voltage larger than the first voltage between the first and second electrodes; and a nucleus region formation portion arranged on the first support substrate to form a nucleus region in the switching region corresponding to the nucleus region formation portion in the liquid crystal layer, wherein the splay alignment in the nucleus region is more stable than in the switching region; and wherein the first and second shutters are switched between a transmissive state and a shielding state in synchronizing with pictures of the display unit.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

DETAILED DESCRIPTION OF THE INVENTION

Figure 1:
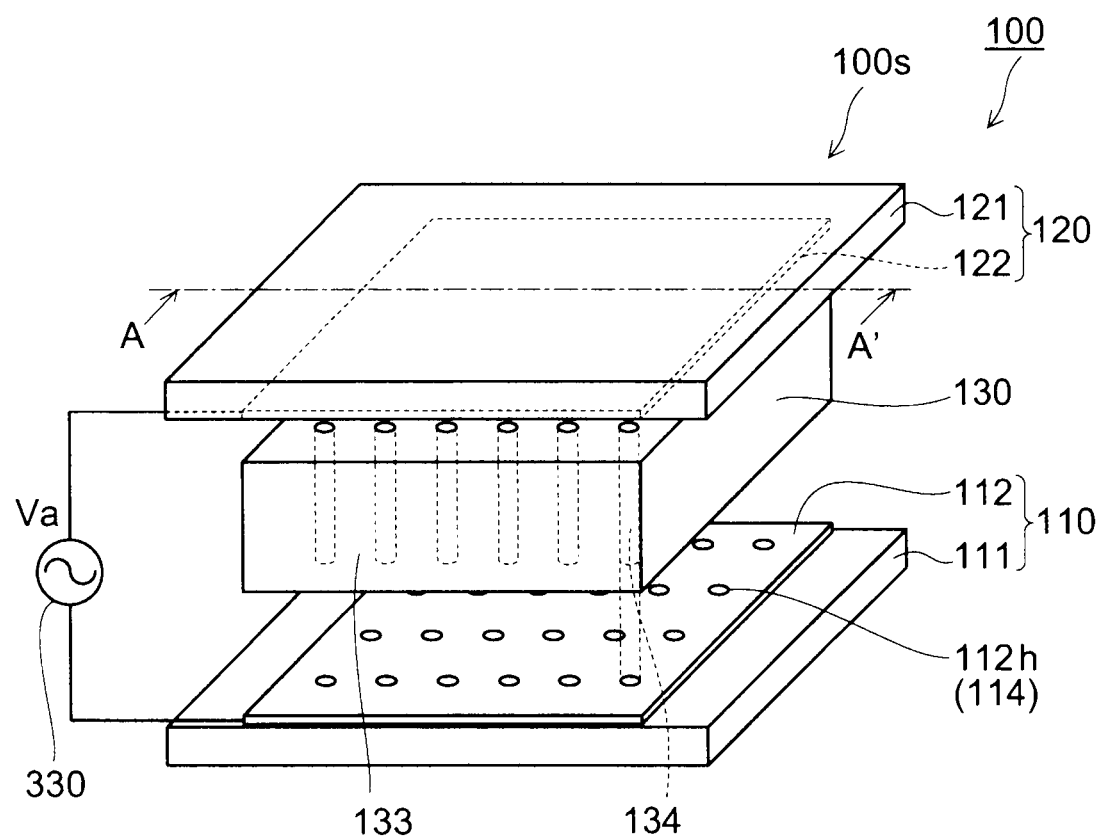
FIG. 1 is an exploded perspective view showing a schematic structure of a liquid crystal shutter according to a first embodiment of the present invention.

A liquid crystal shutter according to an exemplary embodiment of the present invention will now be described with reference to the accompanying drawings wherein the same or like reference numerals designate the same or corresponding portions throughout the several views.

In addition, a drawing is typical or notional, and the ratio of the relation between the thickness or width of portions, and the size coefficients between portions are not necessarily the same as that of an actual thing. Moreover, even if it is a case where the same portion is shown, a mutual size and a ratio coefficient may be differently shown each other.

(First Embodiment)

Hereafter, a liquid crystal shutter will be explained referring to a first embodiment, in which the liquid crystal shutter is used for a pair of glasses of a display system applicable to a three dimensional display system.

Figure 2:
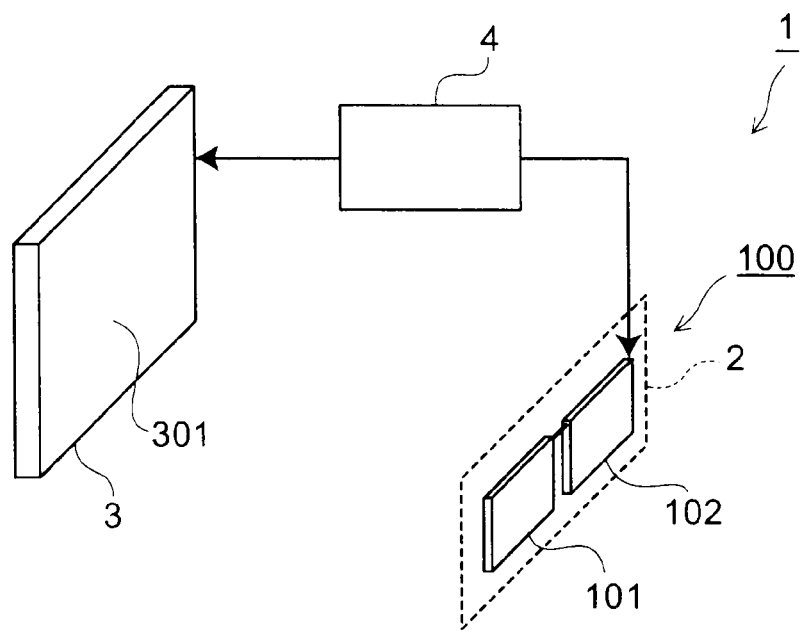
FIG. 2 is diagram showing a structure of a display system in which the liquid crystal shutter according to the first embodiment is used.

FIG. 1 is an exploded perspective view showing a schematic structure of a liquid crystal shutter according to a first embodiment of the present invention. FIG. 2 is a diagram showing a structure of the display system in which the liquid crystal shutter according to the first embodiment is used.

First, a schematic structure of the display system will be explained referring to the case where the liquid crystal shutter is used for the glasses of the display system applicable to the three dimensional display system shown in FIG. 2.

As shown in FIG. 2, the display system 1 includes a display unit 3 and a liquid crystal shutter glasses 2. The display system 1 has a three-dimensional operational mode in which a viewing person does view the parallax images for left and right eyes displayed on the display unit 3. It is noted that the display system 1 may have a two-dimensional operational mode in which the viewing person does view the same image for left and right eyes displayed on a display surface 301 of the display unit 3. Hereinafter, the operational mode in which the viewing person watches the pictures as the three-dimensional imagery will be explained.

The display unit 3 has the display surface 301, in which parallax images for the left eye and the right eye are displayed by turns. For example, an active matrix liquid crystal display which operates in the OCB mode can be used for the display unit 3. The display unit 3 has a plurality of display pixels arranged in a shape of a matrix and displays parallax images by converting field frequency into 120 Hz, for example, by a digital signal processing using a field memory.

The liquid crystal shutter glasses 2 has a pair of shutter portions arranged corresponding to a viewing person's left eye and right eye, respectively. As the pair of shutter portions, a first shutter portion 101 and a second shutter portion 102 are used, for example. The first and second shatter portions 101 and 102 are equipped so that the viewing person's both eyes face the display unit 3 through the first shutter portion 101 and the second shutter portion 102. The liquid crystal shutter glasses 2 is a time sharing shutter glasses with which the first and second shutter portions 101 and 102 are in a transmissive state and a shielding state by turns in synchronizing with the parallax images by the display unit 3.

The first and second shutter portions 101 and 102 are formed as individual portions respectively, or the first and second shutter portions 101 and 102 may be formed integrally in one body. For example, two electrodes in each of the first and second shutter portions 101 and 102 may be formed on the same substrate.

In the display system 1, the viewing person watches the parallax images for the left eye and the right eye in time sharing. For example, for every field, the parallax images corresponding to the left eye and the right eye are alternately displayed on the display unit 3. At this time, in the period when the parallax image for the left eye is displayed on the display unit 3, the shutter portion 101 for the left eye is changed into the transmissive state, and the shutter portion 102 for the right eye is changed into the shielding state. Similarly, in the period when the parallax image for the right eye is displayed on the display unit 3, the shutter portion 102 for the right eye is changed into the transmissive state, and the shutter portion 101 for the left eye is changed into the shielding state.

Moreover, the display system 1 includes a controller 4 to operate the first and second shutter portions 101 and 102. The function of the controller 4 is included in either the display unit 3 or the liquid crystal shutter glasses 2. Transfer of signals between the controller 4 and the display unit 3, between the controller 4 and the liquid crystal shutter glasses 2, and between the display unit 3 and the liquid crystal shutter glasses 2 are performed by a wired or wireless system.

As described above, the liquid crystal shutter glasses 2 controls that the parallax image for the left eye is viewed on the left eye, and the parallax image for the right eye is viewed on the right eye. Thus, in the display system 1, the three-dimensional imagery can be perceived by wearing the liquid crystal shutter glasses 2 and viewing the display unit 3. At least one of the first and second shutters 101 and 102 of the liquid crystal shutter glasses 2 is structured according to this embodiment.

As shown in FIG. 1, the liquid crystal shutter 100 according to this embodiment includes a shutter portion 100s having a first substrate portion 110 and a second substrate portion 120 and a liquid crystal layer 130. The liquid crystal layer 130 is sandwiched by the first and second substrate portions 110 and 120.

In FIG. 1, the first substrate portion 110, the liquid crystal layer 130 and the second substrate portion 120 are illustrated in exploded form to be easily understood. Actually, the first and second substrate portions 110 and 120 contact with the liquid crystal layer 130 respectively, The first substrate portion 110 has a first electrode 112 formed on a main surface of a first support substrate 111. The second substrate portion 120 has a second electrode 122 formed on a main surface of a second support substrate 121. The first substrate portion 110 and the second substrate portion 120 are arranged so that the first electrode 112 and the second electrode 122 oppose each other.

A conductive and transmissive material is used for the first and second electrodes 112 and 122, which are employed in the transmissive and shielding operation in the liquid crystal shutter 100. When the liquid crystal shutter 100 is used for the liquid crystal shutter glasses 2, for example, transparent conductive films, such as ITO (Indium Tin Oxide) and ZnO, are used for the first and second electrodes 112 and 122.

The liquid crystal layer 130 is sandwiched between the first electrode 112 and the second electrode 122. In addition, alignment films, which are not illustrated, are formed on the liquid crystal layer 130 sides of the first electrode 112 and the second electrode 122.

The first and second electrodes 112 and 122 are connected to an outside driver 330 to receive a signal voltage from the driver 330. A switching region 133 is formed in the liquid crystal layer 130. The switching region 133 is a region in which the first electrode 112 and the second electrode 122 oppose each other, and a voltage is applied to the liquid crystal layer 130 between the first and second electrodes 112 and 122.

For example, when a potential difference Va between the first electrode 112 and the second electrode 122 is set to a first voltage V1 in the switching region 133, the liquid crystal layer 130 becomes a splay alignment state. Similarly, when the potential difference Va between the first electrode 112 and the second electrode 122 is set to a second voltage V2 with a larger voltage value than the first voltage V1, the liquid crystal layer 130 becomes a bend alignment state.

The first voltage V1 is small voltage, for example, 0V. That is, the switching region 133 in the liquid crystal layer 130 is aligned to the splay alignment at the time of switch OFF. When the second voltage V2 with a larger voltage value than the first voltage V1 is applied, the alignment state changes from the splay alignment state into the bend alignment state.

Once changing to the bend alignment state, when a first bend voltage VB1 is applied to the switching region 133, the switching region 133 becomes a first bend alignment state, and when a second bend voltage VB2 with a larger voltage value than the first bend voltage VB1 is applied to the switching region 133, the switching region 133 becomes a second bend alignment state. The difference of the optical characteristic (Retardation) of the liquid crystal layer 130 between the first and second bend alignment states is taken out as that of the transmissivity. Namely, the liquid crystal shutter 100 performs a switching operation between passing and shielding of light.

Thus, in the switching region 133, when the voltage larger than a threshold voltage is applied between the first electrode 112 and the second electrode 122, the switching region 133 becomes the bend alignment state from the splay alignment state.

In the bend alignment state, when the first bend voltage VB1 of 0V is applied, the first optical characteristic state is obtained. On the other hand, when the second bend voltage VB2 with a larger voltage value than the first bend voltage VB1 is applied, the second optical characteristic state is obtained. According to the difference of the transmissivity, two optical characteristic states of the liquid crystal 130 are obtained.

If the state where the voltage between the first electrode 112 and the second electrode 122 is continuously kept low (for example, 0V) during a predetermined period, the switching region 133 returns from the bend alignment state to the splay alignment state. Therefore, it is necessary to apply the voltage between the first electrode 112 and the second electrode 122 larger than the threshold voltage periodically so that the applied voltage does not become lower value during a longer period than the predetermined period.

That is, the switching region 133 transits from the splay alignment state to the bend alignment state or the bend alignment state to the splay alignment state reciprocally corresponding to the voltage applied between the first electrode 112 and the second electrode 122. Furthermore, the switching region 133 is aligned to the first bend alignment state where first bend voltage VB1 is applied, and the second bend alignment state where the second bend voltage VB2 is applied in the bend alignment state.

For example, a direct-current voltage is used for the first voltage V1, the second voltage V2, the first bend voltage VB1 and the second bend voltage VB2, however, an alternating voltage may be also used as the voltages V1, V2, VB1 and VB2. However, it is desirable to use the alternating voltage to suppress deviation of the electric charge in the liquid crystal layer 130. In this embodiment, the alternating voltage is used.

The first voltage V1 is 0V, for example, and the second voltage V2 is a voltage larger than the threshold voltage for changing the splay alignment to the bend alignment. A comparatively large voltage, for example, a voltage of 10V-30V is used as the second voltage V2 to change the splay alignment to the bend alignment rapidly. However, if the value of the second voltage V2 is larger than the threshold voltage, the value is arbitrarily decided. If the second voltage V2 is sufficiently large, the switch region 133 is promptly changed from the splay alignment state to the bend alignment state. Specifically, the second voltage V2 can be made by combining a positive pulse (+15V) of about hundreds of milliseconds (ms) with a negative pulse (−15V) of about hundreds of milliseconds (ms), for example. The switching region 133 is transferred to the bend alignment state from the splay alignment state by applying such second voltage V2, for example, in about 1 to 2 seconds.

In this embodiment, the first bend voltage VB1 is 0V, for example, and the second bend voltage VB2 is ±5V. However, in this invention, the value of the first bend voltage VB1 and the second bend voltage VB2 are arbitrarily decided, not limited to above voltages.

For example, the change of the retardation of the switching region 133 is taken out as the change of transmissivity by arranging a polarizing element (i.e., a polarizing plate or a polarizing film) on the first substrate portion 110 and the second substrate portion 120 on the opposite side to the liquid crystal layer 130. The difference of the transmissivity (for example, transmissive/shielding) between the first bend voltage VB1 and the second voltage VB2 can be arbitrarily set by the retardation value and the arrangement of the polarizing element, etc.

Thus, the liquid crystal shutter 100 operates in the OCB mode using π cell (splay alignment cell). In addition, various kinds of retardation plates (i.e., a retardation film or an optical compensation film) may be inserted between either the first substrate portion 110 or the second substrate portion 120 and the polarizing element to adjust the retardation and compensate a viewing angle characteristic.

In the π cell, the liquid crystal alignment of the liquid crystal layer 130 returns from the bend alignment state to the original splay alignment state at the time of power supply OFF, that is, at the time of the operation in which the applied voltage is zero. The transition to the splay alignment state from the bend alignment state is performed by elasticity of the liquid crystal material, and alignment regulation force generated at the interface between the respective first electrode 112 and the second electrode 122 and the liquid crystal layer 130. Accordingly, the control of the transition is difficult because an external force, such as electric power, is not used. Consequently, the transition to the splay alignment state from the bend alignment state is unevenly advanced in the field of the liquid crystal layer 130.

In the liquid crystal shutter 100, at the time of transition to the splay alignment state from the bend alignment state, that is, at the time of reverse transition, the mixed bend alignment regions with the splay alignment region generate spot-like unevenness, and are sighted over a long time, for example, about 3 minutes. It was found that the unevenness especially results in a seriously problem, that is, deteriorated quality when the liquid crystal shatter 100 is applied to the liquid crystal shutter glasses 2 used for the display system 1. If the transition to the splay alignment state from the bend alignment state arises unevenly in the field of a liquid crystal shutter 100, the region where the two alignment states exit in mixture can be seen in a shape of a spot, thereby the quality of a liquid crystal shutter is deteriorated.

In the liquid crystal shutter, although a lot of attention has been paid to the characteristic at the time of operation and various devices for improvement in that characteristic, it has not been pointed out until now that the unevenness occurred at the time of power supply OFF becomes a practical problem, and effective measure for this problem has not been made either.

In a display using an active-matrix drive of the liquid crystal in the OCB mode, each of picture electrodes of minute areas formed in a shape of a matrix becomes a switching region. The switching regions corresponding to the picture electrodes become the bend alignment state, and the control of the transmissivity of light is performed in each switching region. On the other hand, non-pixel regions such as scanning lines and signal lines around the picture electrodes are regions where the voltages are not applied, therefore the splay alignment state is maintained. Thus, in the active-matrix drive display in the OCB mode, even if the splay alignment region is formed in circumference of the minute switching regions, the region such as the nucleus region 134 in this embodiment, which maintains the splay alignment state, is not formed. Furthermore, in the active-matrix drive display in such OCB mode, since a back light is turned off and the whole display surface of the display becomes in a dark state at the time of power supply OFF, the unevenness is not viewed even if the bend alignment state and the splay alignment state exist in mixture.

On the other hand, if the liquid crystal shutter in the OCB mode is applied to the liquid crystal shutter glasses 2, surrounding light enters into the liquid crystal shutter glasses 2. Therefore, the unevenness of the alignment of the liquid crystal layer 130 is viewed. When applying the liquid crystal in the OCB mode to the liquid crystal shutter glasses 2, the electrode of a large area is used for the shutter portion, and the area of the switching region 133 is large. For this reason, the transition to the splay alignment state from the bend alignment state advances unevenly in an unspecified form from an unidentified portion in the switching region 133, at the time of power supply OFF. Since it takes time to complete the transition of the whole surface of the switching region 133, spot-like unevenness is viewed, and which results in a practically serious problem.

The invention is made to the newly discovered above-mentioned subject in the liquid crystal shutter glasses 2. The liquid crystal shutter 100 according to the embodiment controls the transition to the splay alignment state from the bend alignment state at the time of power supply OFF, and offers a high quality liquid crystal shutter which suppresses the unevenness.

As shown in FIG. 1, in the liquid crystal shutter 100 according to this embodiment, the first substrate portion 110 includes a nucleus region formation portion 114 which forms the nucleus region 134 in the liquid crystal layer 130, in which the splay alignment state is more stable than in the switching region 133.

Here, the nucleus region 134 formed in the inside of the switching region 133 maintains the splay alignment state when the switching region 133 is in the state of the bend alignment. Thus, when the switching region 133 is in the state of the bend alignment, "to maintain the state of the splay alignment" is referred as "the splay alignment is more stable than in the switching region 133"

For example, when raising the applied voltage values between the first electrode 112 and the second electrode 122 to larger than the threshold voltage, the alignment in the switching region 133 changes to the bend alignment state from the splay alignment state. However, in the nucleus region 134, the alignment state does not change to the bend alignment state, and the splay alignment state is always maintained. Or, in the nucleus region 134, the alignment state changes to the bent alignment state by applying larger voltage than the voltage by which the switching region 133 is transferred to the bend alignment state.

In the state of the bend alignment, when the applied voltage between the first electrode 112 and the second electrode 122 is fallen rather than the threshold voltage over a long period of time, for example, a power supply is turned off, the splay alignment in the nucleus region 134 serves as a starting point of the transition to the splay alignment state from the bend alignment state, and transition of the whole surface of the switching region 133 is completed uniformly and promptly.

In the liquid crystal shutter 100, the first substrate portion 110 and the second substrate portion 120 can be changed mutually, and the nucleus region formation portion 114 is formed either on the first substrate portion 110 or the second substrate portion 120 portion, and also may be formed for both the first substrate portion 110 and the second substrate portion 120. Hereinafter, a liquid crystal shutter, in which the nucleus region formation portion 114 is formed on the first substrate portion 110, will be explained as a case.

In the liquid crystal shutter 100 according to this embodiment, an opening 112$h$ is formed in the first electrode 112 as the nucleus region formation portion 114. The opening 112$h$ penetrates the first electrode 112 in a stacked direction, in which the first electrode 112, the liquid crystal layer 130, and the second electrode 122 are stacked. Here, the stacked direction, in which the first electrode 112, the liquid crystal layer 130, and the second electrode 122 are stacked, is defined as a z-axis direction.

Thus, since the openings 112$h$ in the first electrode 112 are formed in a predetermined interval as nucleus region formation portions 114, a voltage larger than the threshold voltage is not applied to the liquid crystal layer 130 which counters the openings 112$h$ when a voltage is applied between the first electrode 112 and the second electrode 122. Here, the voltage larger than the threshold voltage means the voltage in which the liquid crystal is transferred to the bend alignment state from the splay alignment state within a predetermined period. Accordingly, even if the potential difference Va between the first electrode 112 and the second electrode 122 is set to the second voltage V2, in which the liquid crystal display is transferred to the bend alignment state, the portion of the liquid crystal layer 130 which counters the opening 112$h$ maintains the splay alignment state, and is not transferred to the bend alignment state. Namely, when the potential difference Va between the first electrode 112 and the second electrode 122 is set to the second voltage V2, the nucleus region 134 in the liquid crystal layer 130 is in the splay alignment state.

On the other hand, if a voltage is applied between the first electrode 112 and the second electrode 122 in the region in which the opening 112$h$ is not formed, the voltage is applied to the liquid crystal without decreasing. Accordingly, if the specific second voltage V2 is applied to the first electrode 112 and the second electrode 122, the liquid crystal corresponding to the region in which the opening 112h is not formed is transferred to the bend alignment state. The region in which the opening 112h is not formed becomes the switching region 133.

The nucleus region 134, in which the splay alignment state is more stable than in the switching region 133, is formed in the liquid crystal layer 130 that counters the opening 112h as the nucleus region formation portion 114 formed on the first substrate portion 110.

Since, even if the switching region 133 around the nucleus region 134 becomes the bend alignment state, the splay alignment state is maintained in the nucleus region 134. Accordingly, the splay alignment state of the nucleus region 134 serves as a nucleus for transitioning from the bend alignment state to the splay alignment state in switching region 133 at the time of power supply OFF of the liquid crystal shutter 100. This transition is performed promptly and uniformly.

Thus, in the liquid crystal shutter 100, when the potential difference Va between the first electrode 112 and the second electrode 122 is set to the second voltage V2, in which the switching region 133 is transferred to the bend alignment state, the voltage applied to the nucleus region 134 is smaller than that applied the switching region 133. Specifically, the voltage larger than the threshold voltage, in which the switching region 133 is transferred to the bend alignment state, is not applied to the nucleus region 134 in the liquid crystal layer 130. Accordingly, the splay alignment state is maintained in the nucleus region 134.

Thereby, the transition to the splay alignment state from the bend alignment state at the time of power supply OFF is controlled, and a high quality liquid crystal shutter which suppresses the unevenness can be provided.

In the case of the comparative example which does not form the nucleus region formation portion 114, unspecified regions of the splay alignment state are produced at the time of power supply OFF, and are gradually expanded with passage of time. Therefore, it takes long time the whole switching region 133 to finish the phase transition from the bend alignment state to the splay alignment state, and during this time, the unspecified mixture of the splay and bend alignment states serve as the unevenness. The unevenness is visible, and which results in inferior liquid crystal shutter quality.

Moreover, even if a voltage larger than the threshold voltage is applied between the first electrode 112 and the second electrode 122, the splay alignment state is maintained in the peripheral regions of the switching region 133 of the liquid crystal layer 130, where the first electrode 112 and the second electrode 122 do not counter. The phase transition to the splay alignment state from the bend alignment state starts from a peripheral region surrounding the switching region 133 or unidentified regions as starting points at the time of the power supply OFF. However, since the phase transition may occur from the peripheral region or unspecified regions of the switching region 133, it takes very long time in order for the whole switching region 133 to be transferred to the splay alignment state at the time of the power supply OFF in the comparative example. Accordingly, the unevenness can be seen for a long time, and which results in inferior liquid crystal shutter quality.

On the other hand, in the liquid crystal shutter 100 according to this embodiment, the nucleus region 134, where the splay alignment state is more stable than in the switching region 133, can be formed in the switching region 133 by providing the nucleus region formation portion 114. Therefore, the phase transition to the splay alignment state from the bend alignment state in the switching region 133 can be speeded up, and the phase transition can be completed in a short time.

As explained above, the nucleus region 134 where the splay alignment state is more stable than in the switching region 133 is formed in the switching region 133. Thereby, the nucleus region 134 which urges the splay alignment state to the inside of the switching region 133 is arranged, and the phase transition to the splay alignment state of the switching region 133 is performed promptly.

Moreover, a plurality of nucleus regions 134 corresponding to the openings 112h formed in the first electrode 112 are arranged dispersedly in the switching region 133. Therefore, the phase transition to the splay alignment in the whole surface of the switching region 133 is completed more quickly.

The phase transition to the splay alignment state from the bend alignment state can be made so as to perform promptly and uniformly by arranging a plurality of nucleus regions 134 in a suitable interval in the switching region 133. Therefore, the unevenness can be controlled and suppressed.

Moreover, the arrangement of the nucleus region formation portion 114 becomes easy by forming the nucleus region formation portion 114 on the first substrate portion 110 or the second substrate portion 120 which forms the nucleus region 134. Thereby, the controllability to arrange the nucleus region 134 in the liquid crystal layer 130 becomes high, and the phase transition to the splay alignment state in the whole surface of the switching region 133 can be carried out with more stabilized condition.

Figure 3:
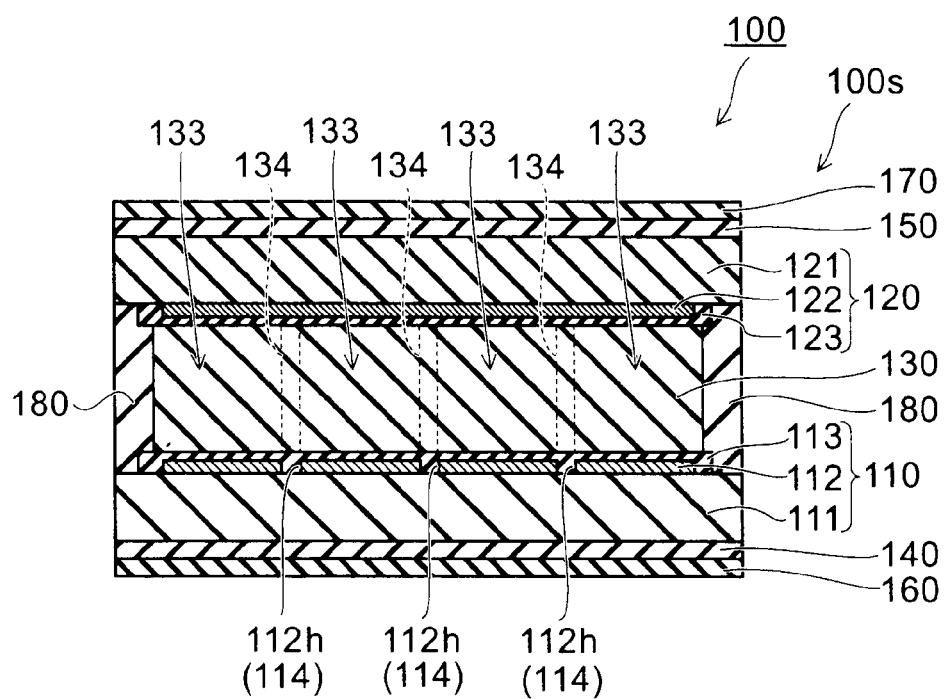
FIG. 3 is a cross-sectional view taken along line A-A in FIG. 1 showing a schematic structure of the liquid crystal shutter according to the first embodiment of the present invention.
Figure 4:
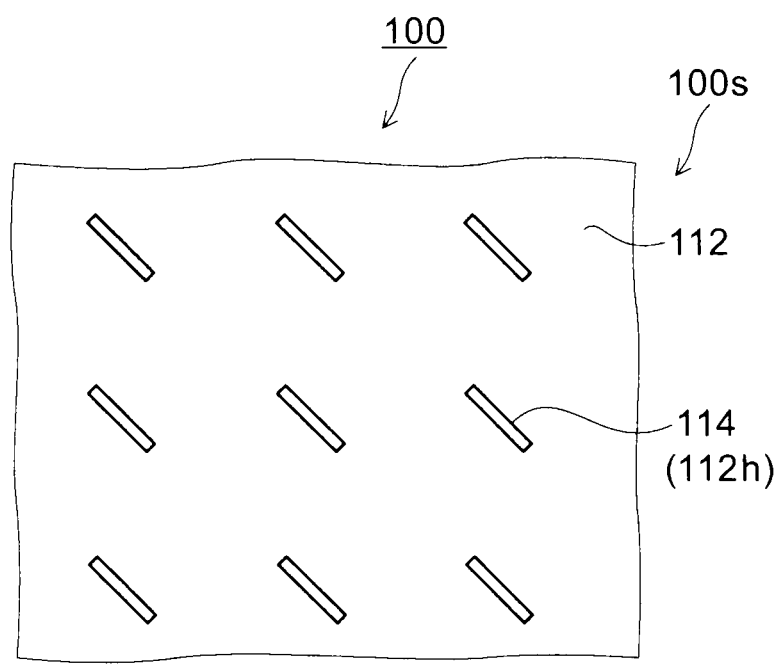
FIG. 4 is a plan view showing a schematic structure of the liquid crystal shutter according to the first embodiment of the present invention.

FIG. 3 is a cross-sectional view taken along line A-A in FIG. 1 showing a schematic structure of a liquid crystal shutter according to the first embodiment of the present invention. FIG. 4 is a plan view showing a schematic structure of a liquid crystal shutter according to the first embodiment. That is, FIG. 4 is a plan view showing the pattern of the nucleus region formation portions 114 formed in the first electrode 112 of the liquid crystal shutter 100.

As shown in FIG. 3, the liquid crystal shutter 100 includes the first substrate portion 110 having the first electrode 112, the second substrate portion 120 having the second electrode 122, and the liquid crystal layer 130 sandwiched between the first electrode 112 and the second electrode 122.

The liquid crystal shutter 100 further includes a seal element 180 formed in a frame shape between the first substrate portion 110 and the second substrate portion 120 so as to surround the liquid crystal layer 130.

Moreover, the liquid crystal shutter 100 includes spacers (not shown) which hold the thickness of the liquid crystal layer 130 uniformly. It is desirable to integrally form pillar-shaped spacers on one of the substrates by patterning resin etc. so as to suppress unspecified optical leak.

The thickness of the liquid crystal layer 130 is set, for example, to the value of the range of 4 μm (micro meter)-5 μm.

Furthermore, the liquid crystal shutter 100 includes a first polarizing plate 160 formed on a back side of the first substrate portion 110, which is an opposite side of the liquid crystal layer 130, and a first optical compensation plate 140 formed between the first substrate portion 110 and the first polarizing plate 160. Similarly, the liquid crystal shutter 100 includes a second polarizing plate 170 formed on a back side of the second substrate portion 120, which is an opposite side of the liquid crystal layer 130, and a second optical compensation plate 150 formed between the second substrate portion 120 and the second polarizing plate 170.

The first substrate portion 110 and the second substrate portion 120 have a transparent first support substrate 111 and a second transparent support substrate 121 made of a transparent plate such as glass plate, and the first transparent electrode 112 and the second transparent electrode 122 are formed on the principal surfaces of the first support substrate 111 and the second support substrate 121 respectively.

First and second alignment films 113 and 123 are formed on the first and second electrodes 112 and 122 so as to contact with the liquid crystal layer 130, respectively.

Polyimide is used for the first and second alignment films 113 and 123. Rubbing processing is performed to the polyimide films used as the first and second alignment films 113 and 123, and the first substrate portion 110 and the second substrate portion 120 are arranged so that the direction of rubbing in the alignment films 113 and 123 becomes parallel each other.

A nematic liquid crystal material is used for the liquid crystal layer 130, and the liquid crystal molecule of the liquid crystal layer 130 has a high pre-tilt angle near the first substrate portion 110 and the second substrate portion 120 by the function of the first and second alignment films 113 and 123. The liquid crystal layer 130 is aligned in the splay alignment state in an initial state in which a voltage is not applied, and is transferred to the bend alignment state in case of voltage application. Consequently, the liquid crystal shutter 100 operates in the OCB mode.

A biaxial film, which contains an optical anisotropic layer formed of discotheque liquid crystal compound arranged in a hybrid alignment, is used for the first optical compensation plate 140 and the second optical compensation plate 150.

The first substrate portion 110 includes the nucleus region formation portion 114. An opening 112h formed in the first electrode 112 is used as the nucleus region formation portion 114. In this embodiment, the opening 112h penetrates in the first electrode 112 to the first support substrate 111.

The opening 112h has rectangular pattern form, in which the length of the rectangular long edge is 15 µm, and the length of the short edge is 10 µm. It is desirable to set the direction of the long edge of the opening 112h to be substantially parallel to the direction of a long axis of the liquid crystal molecule of the liquid crystal layer 130. The direction of the long axis of the liquid crystal molecule of the liquid crystal layer 130 is substantially parallel to the rubbing direction of the first and second alignment films 113 and 123.

Although there are some variations with the viscoelasticity of the liquid crystal material or the thickness (cell gap) of the liquid crystal layer 130, the length of the opening 112h in the direction which meets in the direction of the long axis of the liquid crystal molecule in the opening 112h influences to the characteristic to maintain the splay alignment state. When the length of the opening 112h along the long axis of the liquid crystal molecule is not less than 10 µm, the splay alignment state is maintained certainly. In order to maintain the splay alignment state in the opening 112h, it is desirable to set the length of the opening 112h along the long axis of the liquid crystal molecule to be not less than 10 µm, more desirably not less than 15 µm.

On the other hand, since some optical leak arises in the opening 112h, the smaller opening size is desirable. Therefore it is desirable that the size of the opening 112h is 100 µm×100 µm or less.

Moreover, the interval of the adjacent openings 112h is set to be about 800 µm in this embodiment. The interval of the openings 112h is arranged at 1500 µm or less and more desirably 1000 µm or less to promote uniform transition (reverse transition) to the splay alignment state from the bend alignment state at the time of voltage OFF. At this time, it desirable to arrange the adjacent openings 112h in substantially equal intervals.

Although there are some variations with the viscoelasticity of the liquid crystal material of the liquid crystal layer 130 or the thickness (cell gap) of the liquid crystal layer 130, etc., as mentioned above, it takes about 3 minutes for the whole liquid crystal shutter, that is, the switching region 133 to be transferred to the splay alignment state in the case the openings 112h are not formed.

On the other hand, in this embodiment, when the interval of the openings 112h is 1500 µm or less, the whole switching region can be transferred to the splay alignment state within 10 seconds, and it does not become a serious problem on visibility. When the interval of the openings 112h is 800 µm like this embodiment, the phase transition to the splay alignment state from the bend alignment state in the whole switching region 133 is able to be completed in about 4 seconds.

However, the various modifications of the form of the nucleus region formation portion 114 may be possible, not limited to this embodiment. The openings 112h are formed with distribution in the first electrode 112. The nucleus region 134 is formed in the liquid crystal layer 130 corresponding to the nucleus region formation portion 114 (opening 112h), and the region corresponding to the first electrode 112 other than opening 112h becomes the switching region 133. The nucleus regions 134 are dotted all over the switching region 133, and arranged so that they are enclosed by the switching region 133.

Figure 5A:
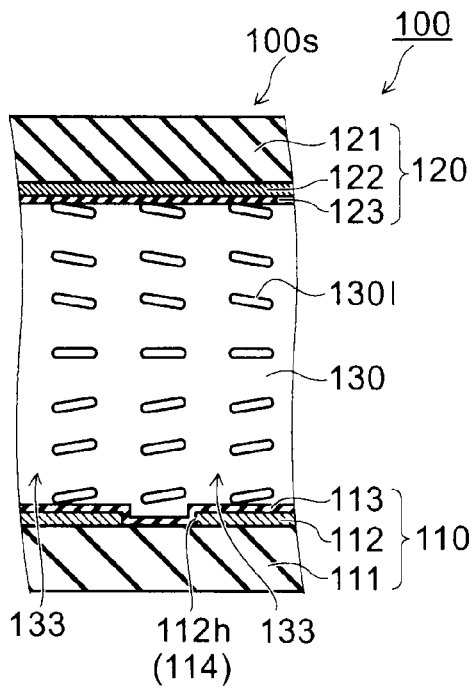
FIGS. 5A to 5C are cross-sectional views showing an operation of the liquid crystal shutter according to the first embodiment of the present invention.
Figure 5B:
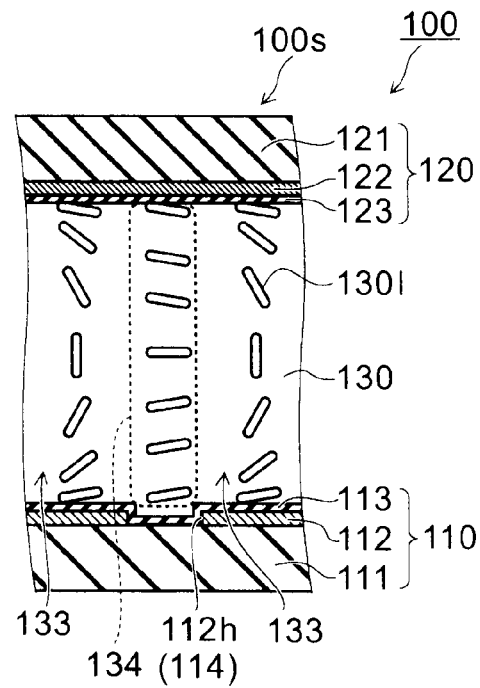
Figure 5C:
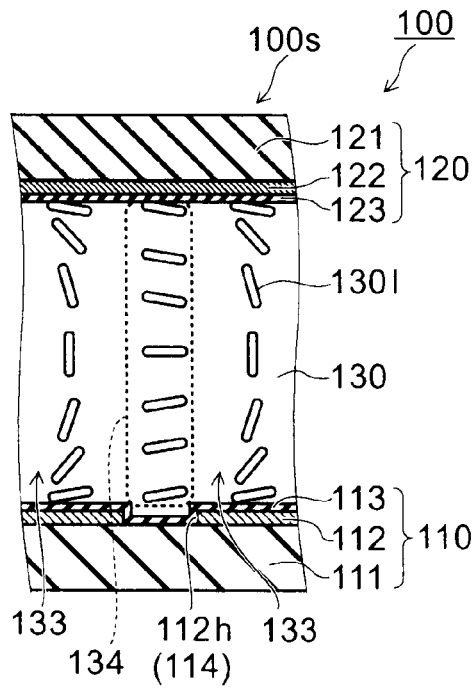

FIG. 5 is a cross-sectional view showing an operation of the liquid crystal shutter according to the first embodiment of the present invention. FIGS. 5A-5C show one opening 112h and its circumference in enlarging, and FIG. 5A corresponds to a state at the time of power supply OFF (at the time of first voltage V1 application), and FIG. 5B corresponds to a state when the first bend voltage VB1 is applied in the bend alignment state at the time of power supply ON, and FIG. 5C corresponds to a state when the second bend voltage VB2 with a larger voltage value than the first bend voltage VB1 is applied in the bend alignment state. In this embodiment, when the first bend voltage VB1 is applied, the liquid crystal shutter 100 is in the transmissive state, and when the second bend voltage VB2 is applied, the liquid crystal shutter 100 is in the shielding state. As explained above, another switching operation is possible. That is, when the first bend voltage VB1 is applied, the liquid crystal shutter 100 changes into the shielding state, and when the second bend voltage VB2 is applied, the liquid crystal shutter 10 changes to the transmissive state.

As shown in FIG. 5A, in the liquid crystal shutter 100, the alignment of the liquid crystal molecule 130l of the liquid crystal layer 130 is in the splay alignment state at the time of power supply OFF. In the liquid crystal shutter 100, a predetermined transition voltage of the second voltage V2 to transfer to the bend alignment state is applied to the liquid crystal layer 130. Then, initialization processing is performed to transfer the alignment state of the switching region 133 in the liquid crystal layer 130 to the bend alignment state from the splay alignment state. As the transition voltage, it is desirable to apply positive/negative alternate voltage, for example, the voltages of ±15V can be used so that direct-current voltage does not remain at the time of operation. The initialization processing can be completed in about 3 seconds to transfer to the bend alignment state from the splay alignment state, although it is dependent on environmental temperature.

Thereby, as shown in FIGS. 5B and 5C, the liquid crystal layer 130 is in the bend alignment state in the switching region 133. A switching operation is performed between the state (FIG. 5B) where the first bend voltage VB1 of 0V is applied, for example, and the state (FIG. 5C) where the second bend voltage VB2 of ±10V is applied. That is, in the switching region 133, the liquid crystal molecule 130*l* is maintained in the bend alignment state during the operation of the liquid crystal shutter 100, and if the voltage applied to the liquid crystal molecule 130*l* of the bend alignment state is changed, the alignment state changes. Corresponding to the change of the alignment state, the transmissive state and the shielding state are acquired by the first polarizing plates 160 and the second polarizing plate 170 which sandwich the liquid crystal layer 130.

The liquid crystal shutter 100 is applicable to the liquid crystal shutter glasses 2 which has the first shutter portion 101 and the second shutter portion 102. In this case, the first shutter portion 101 and the second shutter portion 102 perform an operation which repeats the transmissive state and the shielding state by turns. For example, the first shutter portion 101 is in the shielding state in an odd number field, and is in the transmissive state in an even number field. On the other hand, the second shutter portion 102 is in the transmissive state in the odd number field, and is in the shielding state in the even number field.

In the first shutter portion 101, a voltage of +10V (second bend voltage VB2) is applied to the liquid crystal layer 130 in the first field, and the first shutter portion 101 changes into the shielding state. Next, a voltage of 0V (first bend voltage VB1) is applied to the liquid crystal layer 130 in the second next field, and the first shutter portion 101 changes into the transmissive state. Then, a voltage of −10V (second bend voltage VB2) is applied to the liquid crystal layer 130 in the third field, thereby, the first shutter portion 101 changes into the shielding state. Next, a voltage of 0V (first bend voltage VB1) is applied to the liquid crystal layer 130 in the fourth field, and the first shutter portion 101 changes into the transmissive state. Moreover, the replaced voltages of the odd number field and the even number field in the first shutter portion 101 are applied to the second shutter portion 102. Thus, positive/negative alternate voltage is applied to the liquid crystal layer 130, thereby, image sticking phenomenon etc. can be prevented at the time of the drive operation. In the period of the one field, an alternate voltage can be applied. For example, a burst signal-like waveform, that is, a higher frequency voltage of ±10 V than the field frequency in the odd number field, and a voltage of 0V in the even number field may be applied. When the liquid crystal shutter 100 is applied to the liquid crystal shutter glasses 2, since ON and OFF are changed in a short cycle during the operation, a low-voltage state is not maintained over a long period. Thereby, the bend state is maintained As shown in FIGS. 5B and 5C, a voltage larger than the threshold voltage to transfer to the bend alignment state is not applied to the liquid crystal layer 130 opposing the opening 112*h*, which is the nucleus region formation portion 114, even if the second voltage V2 (voltage to transfer to the bend alignment state), the first bend voltage VB1 and the second bend voltage VB2 are applied between the first electrode 112 and the second electrode 122. Accordingly, the splay alignment state is maintained in the liquid crystal layer 130 which opposes to the opening 112*h*, that is, the nucleus region formation portion 114.

In the liquid crystal shutter 100, at the time of power supply OFF, once a voltage of 0V is applied between the first electrode 112 and the second electrode 122 for a predetermined time, for example, for 1 second while making between the first electrode 112 and the second electrode 122 short-circuit. Then, the power supply is cut off. Consequently, the alignment state of the liquid crystal molecule 130*l* in the switching region 133 is transferred to the splay alignment state from the bend alignment state. At this time, since the splay alignment state is maintained locally in the liquid crystal layer 130 corresponding to the nucleus region formation portion 114 (opening 112*h*), the switching region 133 is transferred from the bend alignment state to the splay alignment state promptly by each of the nucleus region formation portions 114 as starting points of the transition.

In the case where the nucleus region formation portion 114 is not formed, it takes three minutes to complete the transition to the splay alignment state from the bend alignment state in the whole surface of the liquid crystal shutter 100. On the other hand, according to this embodiment, it takes four seconds to transfer to the splay alignment state from the bend alignment state in the whole surface of the liquid crystal shutter 100. Further, since the openings 112*h* are arranged in equal intervals, the phase transition to the splay alignment state from the bend alignment state is uniformly done in a field, and the forming of undesired stain is not detected in the process of the transition, either.

According to the embodiment shown in FIGS. 5A-5C, the splay alignment state is maintained in the nucleus region 134 in the liquid crystal layer 130 corresponding to the nucleus region formation portion 114 (opening 112*h*). However, the splay alignment state in this nucleus region 134 can be modified into other forms than the splay alignment state shown in FIGS. 5A-5C. In the nucleus region 134 shown in FIGS. 5A-5C, the whole region between the first electrode 112 and the second electrode 122 is in the splay alignment state and does not have a portion of the bend alignment state. The present invention is not restricted to this embodiment. Namely, according to modifications, the alignment in the nucleus region formation portion 114 (opening 112*h*) includes the bend alignment near the second electrode 122 and the splay alignment near the first electrode 112. The alignment state is called ("splay-bend alignment state"). Similarly, according to other modification, the alignment in the nucleus region formation portion 114 (opening 112*h*) includes the splay alignment near the second electrode 122 and the bend alignment near the first electrode 112, called ("bend-splay alignment state"). On the other hand, in the "bend alignment", both neighborhood of the first electrode 112 and the second electrode 122 is the bend alignment state. Thus, since the nucleus region formation portion 114 has a splay alignment state more stable than in the switching region 133, at least one side of the first electrode 112 and the second electrode 122 may be the splay alignment in the modification.

According to the above structure, the liquid crystal layer 130 corresponding to the nucleus region formation portion 114 is in the state where the "splay-bend alignment state" and "bend-splay alignment state" exist together in one nucleus region 134, and therefore phase transition to the bend alignment is not detected.

As mentioned above, it is desirable to set the length of the opening 112*h* along the long axis of the liquid crystal molecule to be not less than 10 μm and more preferably, not less than 15 μm. Under this condition, the liquid crystal layer 130 (nucleus region formation portion 114) corresponding to the opening 112*h* is in the splay alignment state, or in the state where the above-mentioned "splay-bend alignment state" and "bend-splay alignment state" exist together in one nucleus region 134. Accordingly, it is suppressed without fault that the nucleus region formation portion 114 becomes in the bend alignment state. Further, transition time is shorten.

Although the applied voltage to the liquid crystal layer 130 corresponding to the opening 112h is set to become lower than that applied to the switching region 133 by forming the opening 112h, leaked electrical field from the first electrode 112 and the second electrode 122 in the peripheral portion of the opening 112h penetrates from the switching region 133. The leaked electrical field contains a lateral electrical field including a perpendicular ingredient with respect to a direction from the first electrode 112 to the second electrode 122. If the size of the opening 112h becomes small, the influence of the leaked electrical field of the peripheral portion becomes large. Therefore, if the size of the opening 112h becomes small, it becomes difficult to maintain the splay alignment state by the leaked electrical field. In more detail, if the size of the opening 112h becomes small, it becomes difficult by the leak electrical field that the above-mentioned "splay-bend alignment state" and the "bend-splay alignment state" exist together. Consequently, the nucleus region 134 may be transferred to the bend alignment state. Since the leaked electrical field is also dependent on the thickness of the liquid crystal layer 130, or other specifications, the opening 112h is designed in consideration of the influence of the leaked electrical field. The length of the opening 112h (the length along the long axis of the liquid crystal molecule) is desirably set to be not less than 10 μm, and more desirably not less than 15 μm practically.

The opening 112h as the nucleus region formation portion 114 in the first electrode 112 is formed simultaneously with patterning of the conductive film used as the first electrode 112. Since an additional process for producing the nucleus region formation portion 114 is not needed, a high quality liquid crystal shutter can be provided without affecting the productivity.

In the liquid crystal shutter 100 according to this embodiment, the opening 112h which penetrates in the first electrode 112 as the nucleus region formation portion 114 is used so that the voltage applied to the nucleus region 134 in the liquid crystal layer 130 becomes smaller than the voltage applied to the switching region 133. However, the present invention is not limited to the opening. For example, a recessed portion formed in the first electrode 112 is filled up with an insulating material, and the voltage applied to the nucleus region 134 can be made smaller than the voltage applied to the switching region 133 in the liquid crystal layer 130. Insulating materials such as a non-organic material and an organic material can be used to fill up the recessed portion to form an insulated portion. In this structure, the insulated portion formed in the liquid crystal layer 130 side of the first electrode 112 is used as the nucleus region formation portion 114.

Figure 6:
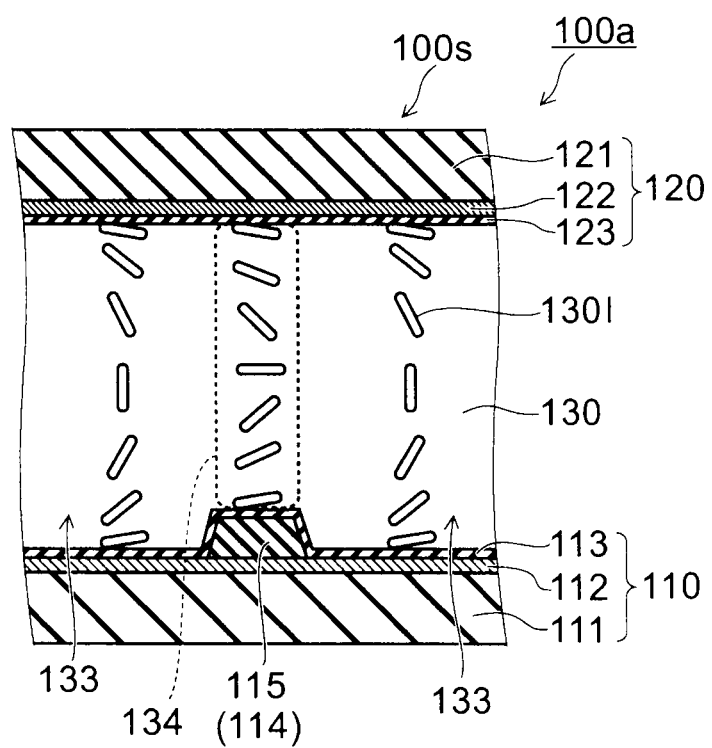
FIG. 6 is a plan view showing a schematic structure of other liquid crystal shutter according to the first embodiment of the present invention.

FIG. 6 is a plan view showing a schematic structure of other type of the liquid crystal shutter according to the first embodiment of the present invention. As shown in FIG. 6, in other liquid crystal shutter 100a according to this embodiment, an insulated protrusion portion 115 is formed on a surface of the first electrode 112 in the first substrate portion 110, which counters the second electrode 122. Insulating materials such as the non-organic material and the organic material are used for the insulated protrusion portion 115. The insulated protrusion portion 115 becomes the nucleus region formation portion 114. The liquid crystal layer 130 corresponding to the insulated protrusion portion 115 serves as the nucleus region 134, and the region in which the insulated protrusion portion 115 is not formed serves as the switching region 133.

That is, in the portion in which the insulated protrusion portion 115 is formed, since the liquid crystal layer 130 and the insulated protrusion portion 115 are arranged between the first electrode 112 and the second electrode 122, the voltage applied between the first electrode 112 and the second electrode 122 is divided into voltages to the liquid crystal layer 130 and the insulated protrusion portion 115.

Accordingly, the voltage applied to the nucleus region 134 in the liquid crystal layer 130 in which the insulated protrusion portion 115 is formed becomes smaller than that applied to the switching region 133 in which the insulated protrusion portion 115 is not formed. Thereby, the nucleus region 134 becomes more stable splay alignment state than in the switching region 133.

That is, the nucleus region 134 transfers to the bend alignment state at higher voltage than the voltage by which the switching region 133 transfers to the bend alignment state, or the nucleus region 134 is not transferred to the bend alignment state, but always maintains the splay alignment state. On the other hand, at the time of power supply OFF, the nucleus region 134 transfers to the splay alignment state at higher voltage than the voltage at which the switching region 133 transfers to the splay alignment state, or the nucleus region 134 always maintains the splay alignment state irrespective of the applied voltage.

Thus, according to the liquid crystal shutter 100a, the transition to the splay alignment state from the bend alignment state is controlled, thereby a high quality liquid crystal shutter in which unevenness is suppressed is obtained.

(Second Embodiment)

Figure 7:
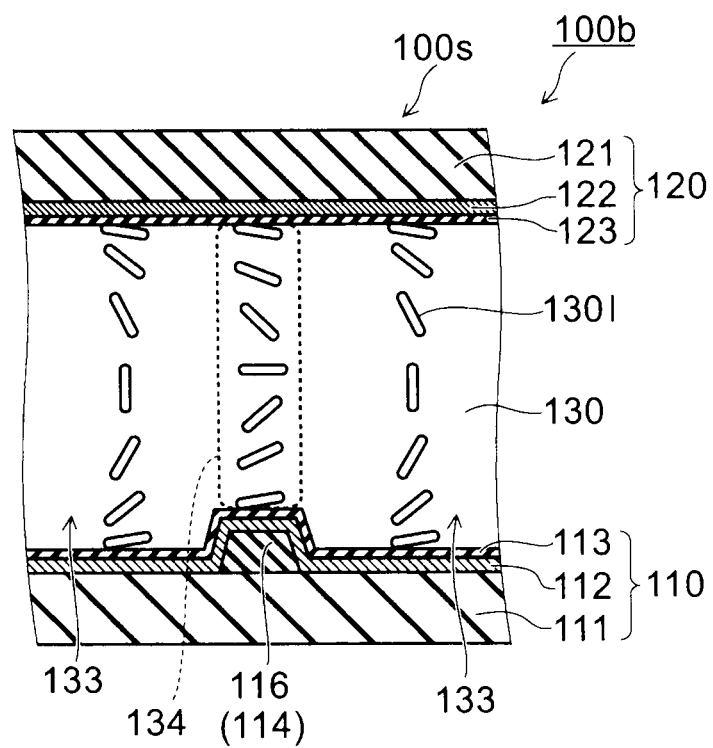
FIG. 7 is a cross-sectional view showing a schematic structure of the liquid crystal shutter according to a second embodiment of the present invention.

According to a second embodiment, the nucleus region 134 in which the splay alignment is stable is formed by making thickness of the liquid crystal layer 130 small locally. FIG. 7 is a cross-sectional view showing a schematic structure of the liquid crystal shutter according to the second embodiment of the present invention.

As shown in FIG. 7, in the liquid crystal shutter 100b according to the second embodiment, a protrusion portion 116 is formed between the first support substrate 111 and the first electrode 112 in the first substrate portion 110. That is, the nucleus region formation portion 114 is the protrusion portion 116 which decreases locally the thickness between the first electrode 112 and the second electrode 122. According to this embodiment, the protrusion portion 116 is covered with the first electrode 112.

As the materials to form the protrusion portion 116, insulating materials such as non-organic materials of silicon oxide and nitride silicon besides organic materials of acrylic resin and polyimide resin, are used. Furthermore, conductive materials, such as metal and semiconductor are also used. Namely, the gap between the first electrode 112 and the second electrode 122 is locally narrowed by the protrusion portion 116, thereby the thickness of the liquid crystal layer 130 of this portion is locally reduced.

The pattern form of the protrusion portion 116 is made to be the same as that of the plane form of the nucleus region formation portion 114 shown in FIG. 4.

A plurality of protrusion portions 116 are formed on the surface of the first support substrate 111 on which the first electrode 112 is formed. The protrusion portion 116 becomes the nucleus region formation portion 114, and the portion in which the protrusion portion 116 is not formed serves as the switching region 133. In this case, the nucleus region formation portion 114 (protrusion portion 116) is arranged so that the nucleus region 134 is enclosed by the switching region 133.

In the nucleus region 134 in which the protrusion portion 116 is formed, since the thickness of the liquid crystal layer 130 is thinner than the switching region 133, the alignment regulation force generated in an interface between the liquid crystal layer 130 and the respective first and second substrate portions 110 and 120 in the nucleus region 134 is stronger than that in the switching region 133.

Therefore, when the applied voltage is raised up, it is hard to transfer to the bend alignment state from an early splay alignment state in the portion with thin thickness of the liquid crystal layer 130, compared with the thick portion. Accordingly, in the nucleus region 134, the alignment transfers to the bend alignment at higher voltage than the voltage at which the switching region 133 transfers to the bend alignment, or the nucleus region 134 is not transferred to the bend alignment, but always maintains the splay alignment. Thus, the nucleus region 134 is formed corresponding to the nucleus region formation portion 114 using the protrusion portion 116.

The above-mentioned protrusion portion 116 is formed on the first electrode 112 without being covered with the first electrode 112 in the liquid crystal layer 130 side. In this case, if the insulating material is used for the protrusion portion 116, both the effect of local reduction of the thickness of the liquid crystal layer 130 by the protrusion portion 116 and another effect of a reduction of the voltage applied to the liquid crystal layer 130 can be achieved. That is, the protrusion portion 116 is formed in the liquid crystal layer 130 side of the first electrode 112. Accordingly, a high quality liquid crystal shutter which can promote more the transition to the splay alignment from the bend alignment is obtained.

According to this embodiment, the height (thickness) of the above-mentioned protrusion portion 116 is set to 2.5 μm in the case where the thickness d of the liquid crystal layer 130 is 5 μm. However, sufficient effect will be acquired if the height (thickness) of the protrusion portion 116 is more than (d×1/5)μm. Moreover, it is desirable that the interval of the adjacent protrusion portions 116 is set to 1500 μm or less and more desirably 1000 μm or less to promote uniform transition (counter transference) to the splay alignment from the bend alignment.

(Third Embodiment)

Figure 8:
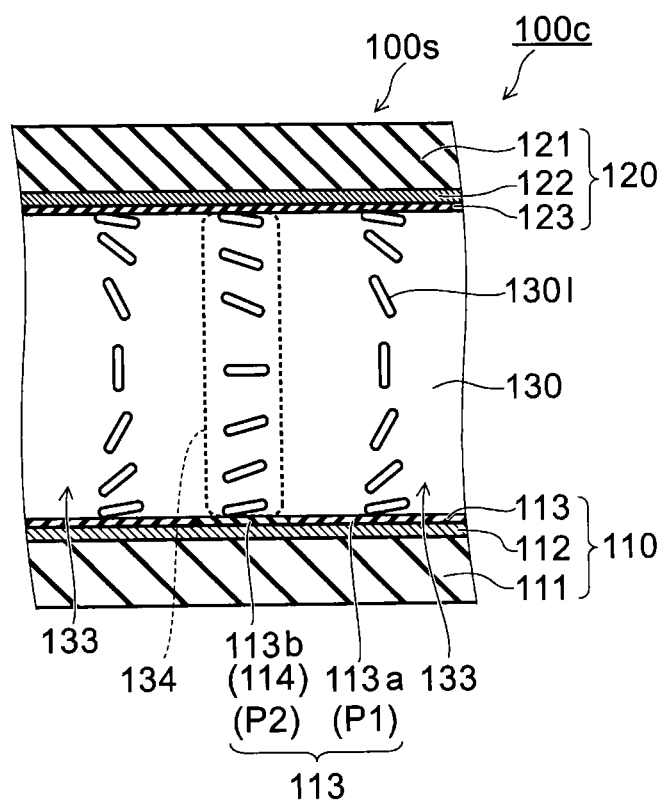
FIG. 8 is a cross-sectional view showing a schematic structure of a liquid crystal shutter according to a third embodiment of the present invention.

In a third embodiment, the nucleus region 134 in which the splay alignment is stable, is formed by changing the alignment state of the liquid crystal molecules of the liquid crystal layer 130 locally. FIG. 8 is a cross-sectional view showing a schematic structure of a liquid crystal shutter according to a third embodiment of the present invention.

As shown in FIG. 8, in the liquid crystal shutter 100c according to this embodiment, the first alignment film 113 is formed in the liquid crystal layer 130 side of the first electrode 112, and the second alignment film 123 is formed in the liquid crystal layer 130 side of the second electrode 122.

In the first alignment film 113, a nucleus region alignment film 113b in which the characteristic to the liquid crystal molecule of the liquid crystal layer 130 differs from others is formed in the first alignment film 113. The nucleus region alignment film 113b serves as the nucleus region formation portion 114. The nucleus region 134 is formed in the liquid crystal layer 130 corresponding to the nucleus region alignment film 113b, and the switching region 133 is formed in the liquid crystal layer 130 corresponding to an alignment film 113a that is other than the nucleus region alignment film 113b.

Namely, the first substrate portion 110 includes the first alignment film 113 formed in the liquid crystal layer 130 side of the first electrode 112 to align the liquid crystal layer 130. The alignment film 113 includes a first region P1 (113a) and a second region P2 (113b) formed in the plane perpendicular to the direction of the z-axis, and the alignment characteristics of the second region P2 (113b) is different from that of the first region P1 (113a). The nucleus region formation portion 114 is the alignment film of the second region P2 (113b).

The nucleus region alignment film 113b is a portion which makes a pre-tilt angle of the liquid crystal molecule smaller than other alignment film 113a. The nucleus region alignment film 113b is formed in the first alignment layer 113 as follows. For instance, the first alignment layer 113 made of polyimide is irradiated through a mask having apertures with UV light. The pre-tilt angle can be selectively made small by irradiation of UV light so as to deteriorate locally the surface state of the first alignment film 113. Namely, the polyimide used for the alignment film 113 is deteriorated by making the long chain alkyl group contained in the polyimide seceded.

Thus, the absolute value of the pre-tilt angle of the liquid crystal layer 130 which touches the second region P2 (113b) is smaller than that of the liquid crystal layer 130 which touches the first region P1 (113a) in the first alignment film 113.

Practically, the pre-tilt angle $\theta 1$ of the liquid crystal layer 130 which touches the first region P1 in the first alignment film 113 is 8 degrees, and the pre-tilt angle $\theta 2$ of the liquid crystal layer 130 which touches the second region P2 in the first alignment film 113 is substantially 0 degree. The interval of the first regions P2 is 1500 μm or less, or more desirably 1000 μm or less like the precedent embodiments in order to promote uniform transition (counter transference) to the splay alignment from the bend alignment.

Though it is dependent on the viscoelasticity of liquid crystal material, the size of the second region P2 is desirably not less than 25 μm×25 μm, so that the nucleus region corresponding to the second region P2 does not transfer from the spay alignment state to the bend alignment state by the influence of the surrounding bend alignment.

The pattern form of the second region P2 (nucleus region alignment layer 113b) can be made to be the same as that of the plane form of the nucleus region formation portion 114 as shown in FIG. 4.

In the region where a pre-tilt angle is small, it is hard to transfer to the bend alignment state from the splay alignment state compared with the region where a pre-tilt angle is large. Accordingly, even if the applied voltage is raised, it is also hard to transfer to the bend alignment state from an early splay alignment state. Therefore, the nucleus region 134 is transferred to the bend alignment state at a higher voltage than the voltage at which the switching region 133 transfers to the bend alignment state. Or the nucleus region 134 is not transferred to the bend alignment state, but always maintains splay alignment state.

Thus, according to the liquid crystal shutter 100c, the transition to the splay alignment state from the bend alignment state is controlled, and the high quality liquid crystal shutter which can suppress the display unevenness is obtained.

In the above embodiment, the alignment characteristic of the second region P2 (nucleus region alignment film 113b) of the first alignment film 113 is required to differ from that of the first region P1 (alignment film 113a). For example, at least one of the characteristic such as the pre-tilt angle, anchoring energy, and coherence length (distance in which the regulation force for the alignment reaches into a liquid crystal layer from the alignment film) differs each other.

That is, the regulation force of the second region P2 in the first alignment film 113 to the liquid crystal layer 130 is stronger than that of the first region P1 to the liquid crystal layer 130.

The difference of the alignment characteristic between the first region P1 (the alignment film 113a) and second region P2 (nucleus region alignment film 113b) is detectable by observing the liquid crystal layer 130, for example, using a polarization microscope and applying a voltage to the first electrode 112 and the second electrode 122, while changing the applied voltage. Namely, if a region having locally different electro-optical characteristic from other regions exists in the liquid crystal layer 130, it is presumed that a region in which the characteristic of the first alignment film 113 is locally different from others is formed, under following such conditions that the electrodes are flat, a uniform voltage is applied to the liquid crystal layer 130, and that the thickness of the liquid crystal layer 130 is uniform. As other method, the surface of the first alignment film 113 is observed to find a region where the surface state differs from others by AFM (atomic force microscope). When the region, in which the surface state differs from others on the film, is observed, the region is presumed to be the second region P2.

Other than the method of irradiating with UV light through the mask having the opening, following some methods are applied to form the second region P2. For example, a method of irradiating the alignment film with the laser light of a spot while scanning, a method of deteriorating the film surface by dry or wet processing in which a mask is prepared in the surface of the film, a method of forming deterioration portions by splaying particles on the surface of the film, a method of affixing a stamp on the surface of the film, and a method of forming an locally affected portion such as scratch on the film, are applicable.

Furthermore, following methods to form the second region P2 are also employed, such as a method of arranging two kinds alignment films whose characteristic is different each other in a different position on the surface of the first electrode 112, and a method of forming a first film on a second film whose characteristic is different from that of the first film.

As described above, at least one of the following structures is applied as the nucleus region formation portion 114, such as the structure (Ex. opening 112h formed in the first electrode 112) in which the applied voltage to the liquid crystal layer 130 is locally changed, the structure (Ex. protrusion portion 116 formed in the first substrate portion 110) in which the thickness of the liquid crystal layer 130 is locally changed, and a structure (Ex., the second region P2 formed in the alignment film 113) in which the alignment characteristic to the liquid crystal layer 130 is locally changed. For example, two or more of the above-mentioned structures may be applied simultaneously.

FIGS. 9A to 9H are schematic plan views showing structures of the nucleus region formation portions 114 of the liquid crystal shutter according the embodiments of the present invention. That is, the figures illustrate the plane patterns, when the nucleus region formation portion 114 is cut at a perpendicular plane with respect to the z-axis. The plane patterns of the nucleus region formation portions 114 can have various forms besides the rectangle shape shown in FIG. 4.

Figures 9A, 9B, 9C, 9D, 9E, 9F, 9G, 9H:
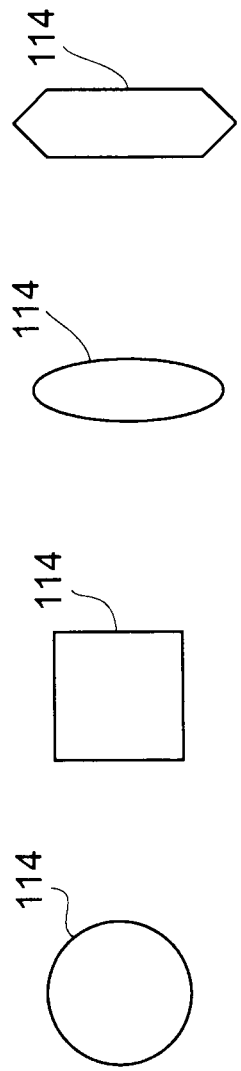
FIGS. 9A to 9H are schematic plan views showing structures of nucleus region formation portions of the liquid crystal shutter according to the embodiments of the present invention.

For example, as shown in FIGS. 9A and 9B, the plane patterns of the nucleus region formation portions 114 is made into a round shape and a square which are isotropic shapes. Moreover, some polygon shapes are used as the plane patterns of the nucleus region formation portions 114.

In addition, as shown in FIGS. 9C-9H, an anisotropic shape is used as the plane patterns of the nucleus region formation portions 114, for example, such as an ellipse shape shown in FIG. 9C, a hexagon shape shown in FIG. 9D, a square neighborhood shape shown in FIG. 9 E, a lozenge shape shown in FIG. 9F, a trapezoid shape shown in FIG. 9G, and a triangle shape shown in FIG. 9H.

When the plane pattern of the nucleus region formation portion 114 is anisotropic, the axis of the plane pattern of the nucleus region formation portion 114 is arranged in parallel with the director of the liquid crystal molecule 130l, that is, the rubbing direction of the alignment film 113, or may be arranged perpendicularly each other, and also may be arranged so as to meet with angles of 0 to 90 degrees each other. The ease of the phase transition between the splay alignment state and the bend alignment state in each of the switching region 133 and the nucleus region 134 changes, for example, depending on the angle which the axis of the nucleus region formation portion 114 and the director of the liquid crystal molecule 130l make. Accordingly, the above-mentioned angle is set appropriately in consideration of the ease of the transition to the bend alignment state from the splay alignment state in the switching region 133 and the stability in the splay alignment in the nucleus region 134.

As described above, the nucleus region formation portion 114 may be formed on both the first substrate portion 110 and the second substrate portion 120, and the plane pattern form of the nucleus region formation portion 114 on the first substrate portion 110 may differ from that of the second substrate portion 120. When the nucleus region formation portions 114 on the first substrate portion 110 and the second substrate portion 120 are arranged so as to face each other, the formation of the nucleus region 134 can be ensured.

The respective sizes of the plane pattern in the nucleus region formation portions 114 may be equal to or different from each other. For example, the respective sizes of the nucleus region formation portions 114 may be changed from the central portion where the first electrode 112 and the second electrode 122 face along the direction which goes to a peripheral portion.

Moreover, the interval of the adjacent nucleus region formation portions 114 may be equal to and different from each other. For example, the interval of the adjacent nucleus region formation portions 114 may be also changed from the central portion where the first electrode 112 and the second electrode 122 face along the direction which goes to a peripheral portion.

Moreover, the liquid crystal shutter can be devised so that the pattern of the nucleus region formation portion 114 is emerged by controlling the arrangement of the nucleus region formation portion 114, at the time of power supply OFF. Thereby, the design application of the liquid crystal shutter is improved. As the pattern form, each maker's logo mark, etc. can be used, for example.

For example, when the liquid crystal shutter is applied to the glasses 2 of the display system 1, the size of the nucleus region formation portion 114 corresponding to a pupil of people's eye is made smaller than other portions, and the interval of the adjacent nucleus region formation portions 114 is also made large. Accordingly, the nucleus region formation portions 114 and the nucleus regions 134 become difficult to be conspicuous, and the shutter quality is improved more.

(Fourth Embodiment)

Figure 10A:
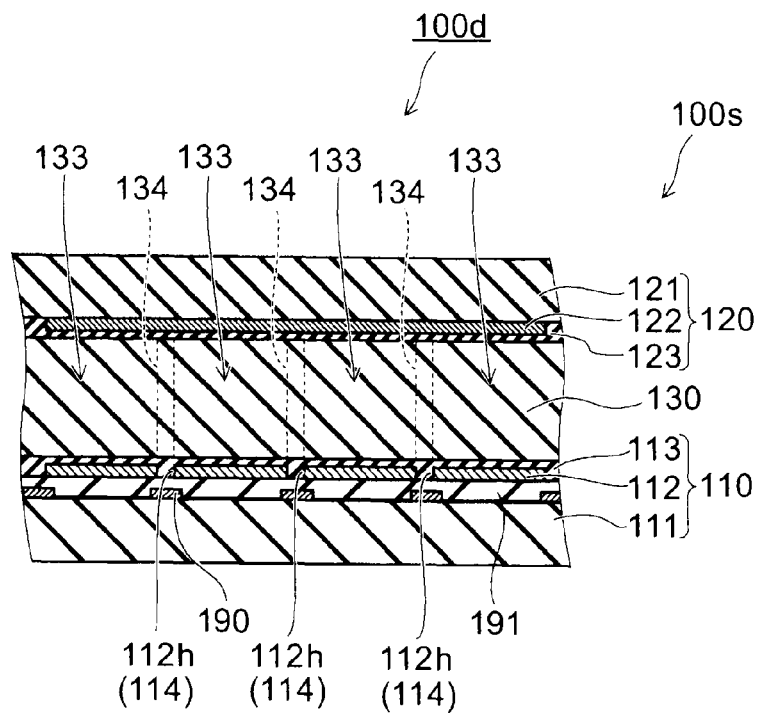
FIGS. 10A and 10B are cross-sectional views showing schematic structures of a liquid crystal shutter according to a fourth embodiment of the present invention.
Figure 10B:
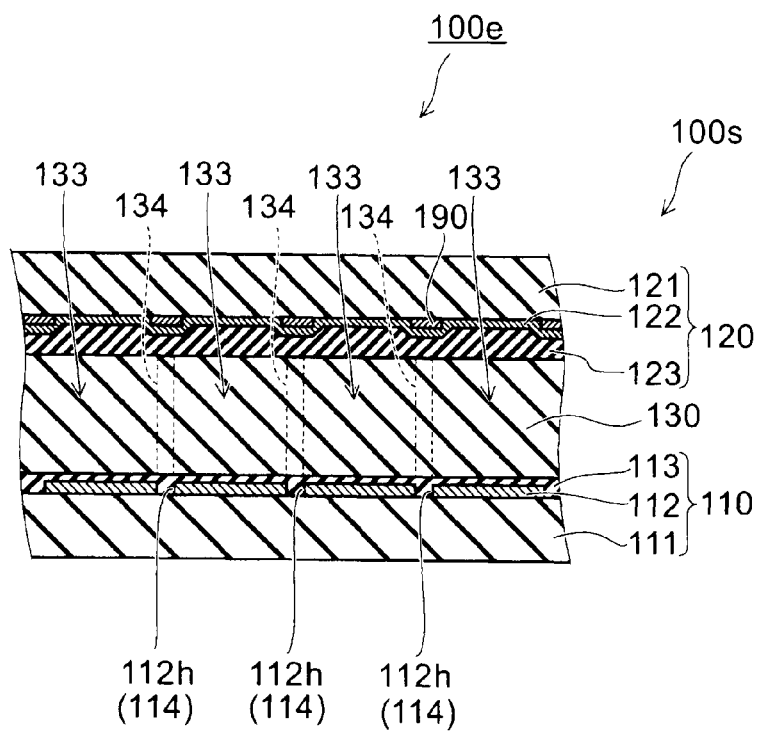

FIGS. 10A and 10B are cross-sectional views showing schematic structures of the liquid crystal shutters according to a fourth embodiment of the present invention. As shown in FIG. 10A, in the liquid crystal shutter 100d according to this embodiment, the first substrate portion 110 further includes a shielding layer 190 to shield the nucleus region formation portion 114. That is, the shielding layer 190 is formed between the first support substrate 111 and the first electrode 112, and an insulating layer 191 is formed between the shielding layer 190 and the first electrode 112. Except this, the structure is the same as that of the liquid crystal shutter 100 shown in FIG. 3.

Moreover, as shown in FIG. 10B, in another liquid crystal shutter 100e according this embodiment, the second substrate portion 120 further includes a shielding layer 190 which shields the nucleus region formation portion 114. That is, the shielding layer 190 is formed between the second support substrate 121 and the second electrode 122. Except this, the structure is the same as that of the liquid crystal shutter 100 shown in FIG. 3.

Thus, the shielding layer 190 is formed on either the first substrate portion 110 or the second substrate portion 120. The shielding layer 190 overlaps with the nucleus region formation portion 114 in a plane perpendicular to z axis.

Since the nucleus region 134 formed in the liquid crystal layer 130 by the nucleus region formation portion 114 differs in the optical characteristic from the switching region 133, the nucleus region 134 may be in a transmissive state when the switching region 133 is in a shielding state. Accordingly, light may leak from the nucleus region formation portion 114. At this time, the leaked light is suppressed by forming the shielding layer 190 which shields the nucleus region formation portion 114, thereby a liquid crystal shutter with higher shutter quality can be provided.

The shielding layer 190 does not need to interrupt light completely, and may just reduce the intensity of the leaked light generated corresponding to the nucleus region formation portion 114. A resin film having optical absorption characteristics, a metal film, various kinds of compound films, etc. are used for the shielding layer 190. Moreover, a conductive film or an insulating film is used as the shielding layer 190. However, the insulating film is used for the shielding layer 190 when adopting the structure in which the voltage applied to the liquid crystal layer 130 is reduced locally using the opening 112h formed in the first electrode 112, as the nucleus region formation portion 114. Thereby, the function of the nucleus region formation portion 114 can be maintained. Moreover, when the shielding layer 190 is formed in the first substrate portion 110 by interposing the insulating layer 191 between the first electrode 112 and the shielding layer 190 at a case, a conductive shielding layer 190 may be used.

In the liquid crystal shutters 100a, 100b, and 100c according to the preceding embodiments, the shielding layer 190 are also formed.

In the liquid crystal shutter 100d shown in FIG. 10A, since the insulating layer 191 is formed between the shielding layer 190 and the first electrode 112, a conductive metal can be used as the shielding layer 190. In the outside of the liquid crystal layer 130, for example, the outside of the seal portion 180, a transfer portion (electrode extraction portion) of an island-like plane pattern is formed with the metal film used as the shielding layer 190. The transfer portion is connected with the second electrode 122. That is, a signal supply to the first and second electrodes 112 and 122 is performed on the first substrate portion 110.

Moreover, the conductive shielding layer 190 can also be set so as to have the same potential as the second electrode 122. In this case, since the nucleus region formation portion 114 is compulsorily set to the same potential without being influenced by the size of the opening in the first electrode 112, the splay alignment becomes easy to be maintained.

Namely, as described above, since the influence of the leaked electrical field becomes large depending on the size of the opening 112h, it is desirable to set the size, that is, the length in the direction along the axis of the liquid crystal molecule in the opening 112h to be larger than a predetermined value, for example, not less than 10 μm, more desirably not less than 15 μm in order to maintain the splay alignment.

On the contrary, even if the length of the opening 112h in the direction along a long axis of a liquid crystal molecule is set small, it is easier to maintain the splay alignment state by setting the shielding layer 190 and the second electrode 122 at the same potential.

For example, when the shielding layer 190 and the second electrode 122 are set to be the same potential, the splay alignment in the nucleus region 134 corresponding to the opening 112h is maintained even if the length of the opening 112h is set to 5 μm in the direction along the axis of a liquid crystal molecule by being remarkably shortened. When the openings 112h whose length in the direction along the axis of a liquid crystal molecule is 5 μm are arranged, for example, by regular interval of 400 μm, it takes extremely short time of about 2 seconds at the time of power supply OFF, to transfer the whole switching region 133 to the splay alignment.

Since the opening 112h can be formed very small in this structure, a decrease in light use efficiency can be suppressed to the minimum. Further, since the shielding layer 190 is arranged, the optical leak is also suppressed. As a result, generation of three-dimensional cross talk peculiar to a three-dimensional display system when the time to change the image for the left eye and the image for the right eye is insufficient can be suppressed effectively when the liquid crystal shutter 100d is used for the liquid crystal shutter glasses 2 in the display system 1.

(Fifth Embodiment)

Figure 11:
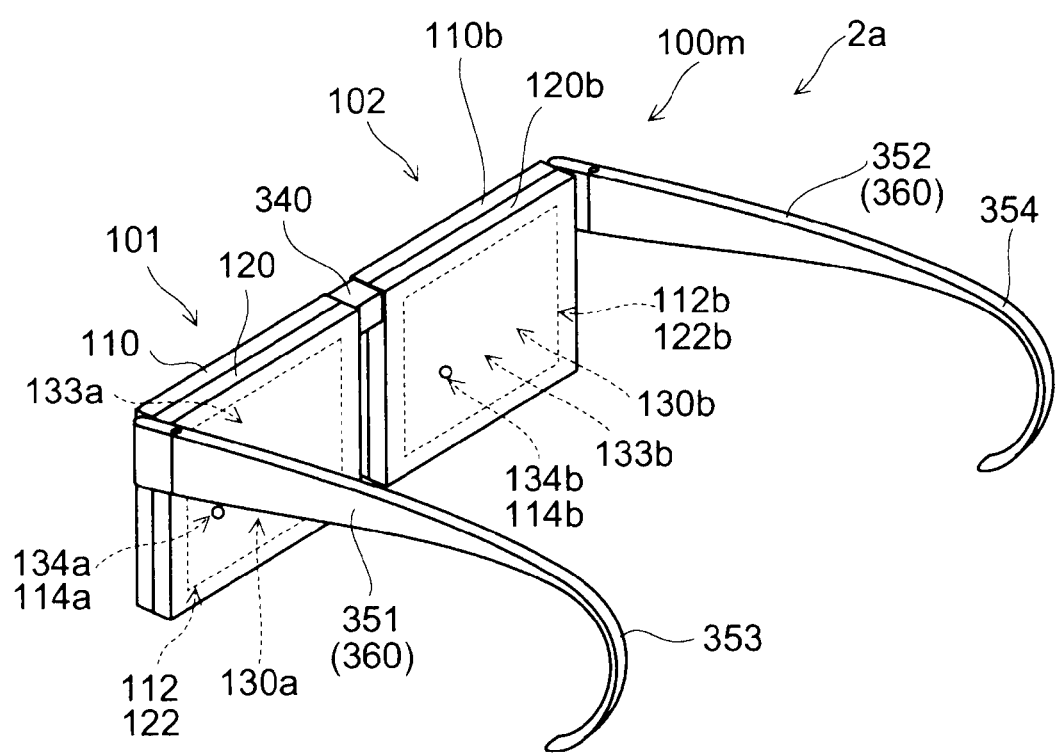
FIG. 11 is a perspective view showing a schematic structure of a liquid crystal shutter according to a fifth embodiment of the present invention.

FIG. 11 is a perspective view showing a schematic structure of a liquid crystal shutter according to a fifth embodiment of the present invention. As shown in FIG. 11, a liquid crystal shutter 100 m according to this embodiment includes two shutter portions.

That is, the liquid crystal shutter 100m includes a first shutter portion 101. A first liquid crystal layer 130a is sandwiched between a first electrode 112 formed on a first substrate portion 110 and a second electrode 122 formed on a second substrate portion 120. In a first switching region 133a in the liquid crystal shutter 100m, when a potential difference between the first electrode 112 and the second electrode 122 is set to a first voltage V1, a first switching region 133a becomes the splay alignment state. On the other hand, when the potential difference between the first electrode 112 and the second electrode 122 is set to a second voltage V2 larger than the first voltage V1, the first switching region 133a becomes the bend alignment state.

That is, the first liquid crystal layer 130a is sandwiched between the first electrode 112 and the second electrode 122, and when a voltage larger than a threshold voltage is applied between the first electrode 112 and the second electrode 122, the first liquid crystal layer 130a is transferred to the bend alignment from the splay alignment.

The first substrate portion 110 includes a first nucleus region formation portion 114a in which a first nucleus region 134a is formed in the first liquid crystal layer 130a. In the first nucleus region 134, a splay alignment state is more stable than that in the first switching region 133a.

Furthermore, the liquid crystal shutter 100m includes a second shutter portion 102 juxtaposed by the first shutter portion 101.

A second liquid crystal layer 130b is sandwiched between a third electrode 112b formed on a third substrate portion 110b and a fourth electrode 122b formed on a fourth substrate portion 120b. In a second switching region 133b in the liquid crystal shutter 100m, when a potential difference between the third electrode 112b and the fourth electrode 122b is set to a third voltage V3, the second switching region 133b becomes the splay alignment state. On the other hand, when the potential difference between the third electrode 112b and the fourth electrode 122b is set to a fourth voltage V4 larger than the third voltage V3, the second switching region 133b becomes the bend alignment state.

That is, like the first liquid crystal layer 130a, the second liquid crystal layer 130b is sandwiched between the first electrode 112b and the second electrode 122b, and when a voltage larger than a threshold voltage is applied between the first electrode 112b and the second electrode 122b, the second liquid crystal layer 130b is transferred to the bend alignment state from the splay alignment state.

The third substrate portion 110b includes a second nucleus region formation portion 114b in which a second nucleus region 134b is formed in the second liquid crystal layer 130b. In the second nucleus region 134b, the splay alignment state is more stable than that in the second switching region 133b.

The structures of the nucleus region formation portion 114 shown in the proceeding embodiments are applied to the first nucleus formation portion 114a and the second nucleus region formation portion 114b.

Thereby, in the first shutter portion 101 and the second shutter portion 102, uniform transition (reverse transition) to the splay alignment state from the bend alignment state can be promoted at the time of power supply OFF, and a high quality liquid crystal shutter is obtained.

The liquid crystal shutter 100m is used as the liquid crystal shutter glasses 2a by using two shutter portions 101 and 102. For example, the liquid crystal shutter glasses 2a includes a connection element 340 to connect the first shutter portion 101 with the second shutter portion 102, a left support element 351 for left ear, and a right support element 352 for right ear. The left support element 351 has a left ear hooking portion 353, and the right support element 352 has a right ear hooking portion 354.

Figure 12:
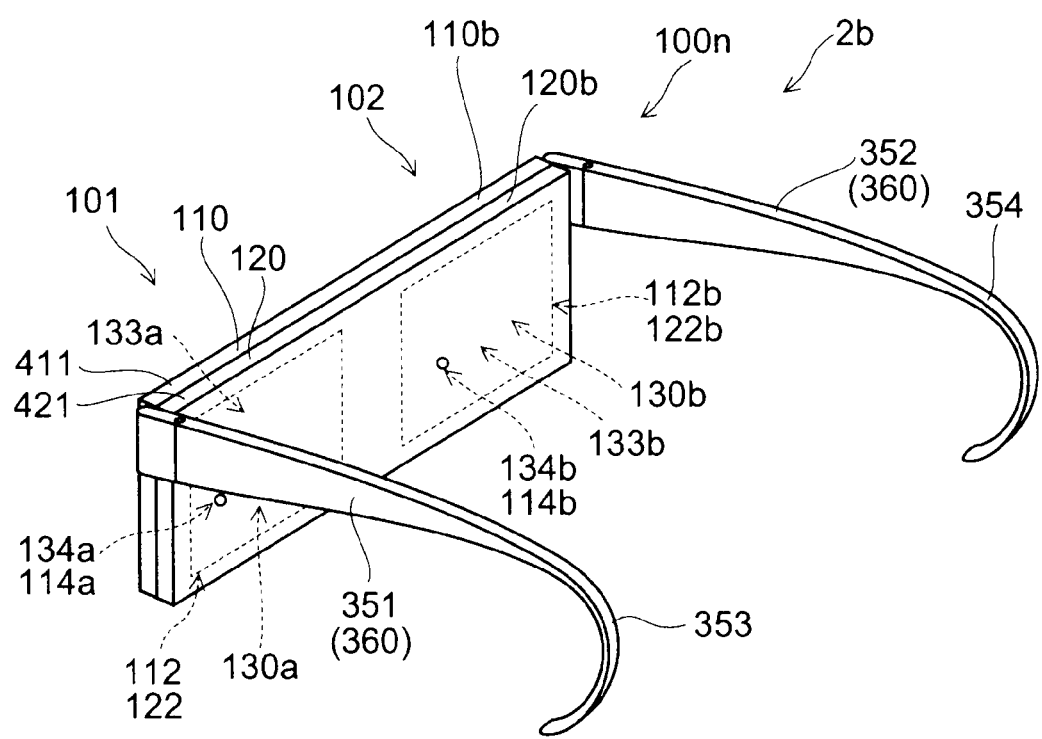
FIG. 12 is a perspective view showing a schematic structure of other liquid crystal shutter according to the fifth embodiment of the present invention.

FIG. 12 is a perspective view showing a schematic structure of other liquid crystal shutter according to the fifth embodiment of the present invention. As shown in FIG. 12, a liquid crystal shutter 100n according this embodiment also includes a first shutter portion 101 and a second shutter portion 102. However, a first substrate portion 110 and a third substrate portion 110b are formed in the same support substrate 411, and a second substrate portion 120 and a fourth substrate portion 120b are formed in the same support substrate 421.

Namely, the first electrode 112 is formed in a portion of the support substrate 411, and the third electrode 112b is formed in another portion of the support substrate 411, juxtaposed to the first electrode 112. The portion in which the first electrode 112 is formed serves as the first substrate portion 110, and the portion in which the third electrode 112b is formed serves as the third substrate portion 110b. Similarly, the second electrode 122 is formed in a portion of another support substrate 421, and the fourth electrode 122b is formed in another portion of the support substrate 421, juxtaposed to the second electrode 122. The portion in which the second electrode 122 is formed serves as the second substrate portion 120, and the portion in which the fourth electrode 122b is formed serves as the fourth substrate portion 120b.

Thus, the first shutter portion 101 and the second shutter portion 102 are formed integrally in one body.

When a liquid crystal shutter is applied to the liquid crystal shutter glasses 2b, the first nucleus region formation portion 114a and the second nucleus region formation portion 114b are formed in the substrate portion of the side near eyes or the side far from eyes.

In the case where the openings formed in the first electrode 112 and the openings formed in the third electrode 112b are used, as the first nucleus region formation portion 114a and the second nucleus region formation portion 114b, the alignment of the holding elements 351 and 352 with the first substrate portion 110 and the third substrate portion 110b is set by appropriately reconciling the workability for formation of the openings, and the optical characteristic of the first electrode 112 and the third electrode 112b.

For example, when transparent conductive films, such as ITO, are used for the first electrode 112, the second electrode 122, the third electrode 112b, and the fourth electrode 122b, the film thickness, in which the transmissivity that is one of the optical characteristics becomes the highest, is not necessarily in agreement to the film thickness with good processability.

Accordingly, the film thickness of the transparent electrodes, for example, the second electrode 122 and the fourth electrode 122b arranged at the side near user's eyes is desirably set to comparatively thick with high transmissivity so that the internal reflection light in the first shutter portion 101 and the second shutter portion 102 is suppressed.

The film thickness of the transparent electrode, for example, the first electrode 112 and the third electrode 112b arranged at a side far from user's eyes are desirably set to comparatively thin film thickness so that processability becomes good.

Thus, as for the thickness of the electrodes, that is, the first electrode 112 and the third electrode 112b arranged at a side far from a user's eyes, it is desirable that the first electrode 112 and the third electrode 112b are thinner than the second electrode 122 and the fourth electrode 122b arranged at the side near user's eyes.

The first electrode 112 and the third electrode 112b are arranged far from user's eyes with better processability, and the nucleus region formation portions 114a and 114b are also arranged at the side far from user's eyes.

Thus, the first shutter portion 101 and the second shutter portion 102 are mounted by a holding portion 360 (for example, a left support element 351 and a right support element 352) at a viewer's head. The second substrate portion 120 is arranged between the first substrate portion 110 in which the first nucleus region formation portion 114a is formed and the left support element 351. Similarly, the fourth substrate portion 120b is also arranged between the third substrate portion 110b in which the second nucleus region formation portion 114b is formed and the right support element 352. According to this embodiment, the first nucleus region formation portion 114a and the second nucleus region formation portion 114b are arranged to a side far from user's eyes, and the processability and the optical characteristic of the openings are reconciled, and also the high quality liquid crystal shutter can be offered. In addition, the holding portion 360 may be a belt-like and a goggles-like form as a liquid crystal shutter.

Figure 13A:
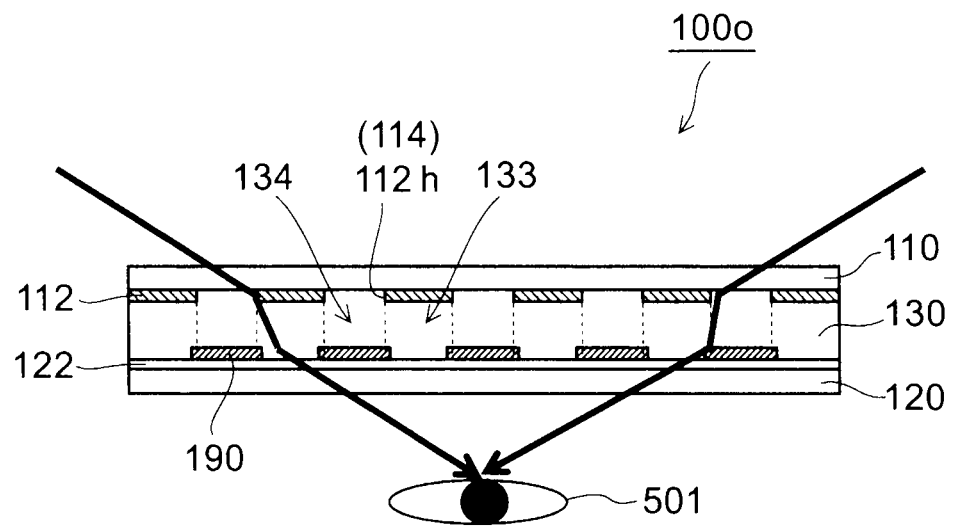
FIGS. 13A and 13B are cross-sectional views showing schematic structures of other liquid crystal shutters according to the fifth embodiment of the present invention.
Figure 13B:
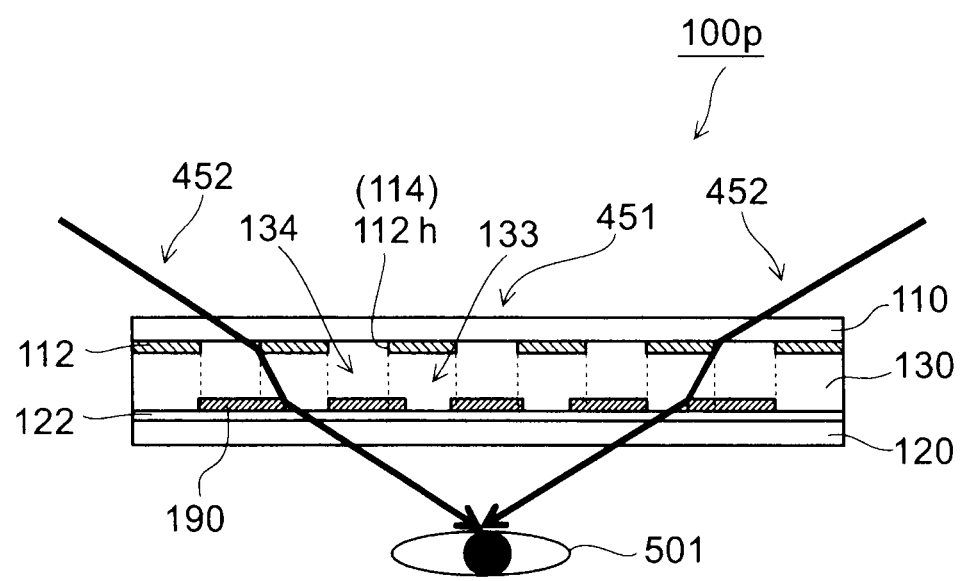

FIGS. 13A and 13B are cross-sectional views showing schematic structures of other liquid crystal shutters according to the fifth embodiment of the present invention. As shown in FIG. 13A, in the liquid crystal shutter 100o according this embodiment, the first substrate portion 110 is located at a side far from user's eyes 501, and the second substrate portion 120 is located at a side near the eyes 501. The opening 112h used as the nucleus region formation portion 114 is formed in the first electrode 112 in the first substrate portion 110, and the shielding layer 190 is formed on the second substrate portion 120.

The shielding layer 190 is formed so that it overlaps with the opening 112h which is the nucleus region formation portion 114. That is, the shielding layer 190 overlaps with the nucleus region formation portion 114 in a plane perpendicular to z axis. Namely, the center of the pattern form of the respective shielding layer 190 and the center of the respective pattern form of the nucleus region formation portion 114 (opening 112h) are substantially in agreement.

In the liquid crystal shutter 100p shown in FIG. 13B, the respective shielding layers 190 formed in the second substrate portion 120 are arranged depending on a viewing angle of user's eye That is, in a central view area 451 corresponding to user's eyes 501, the respective shielding layers 190 overlap with the openings 112h used as the nucleus region formation portions 114, and the center of the pattern form of the respective shielding layers 190 and the center of the respective pattern form of the nucleus region formation portions 114 (opening 112h) are coincided.

On the other hand, in a peripheral view area 452 adjacent to the central view area 451, the center of the respective shielding layers 190 is arranged so as to shift to the central view area 451 side.

In the liquid crystal shutters 100p, users sight not only the light which enters from a perpendicular direction with respect to the liquid crystal shutters 100p but the light from a slant direction. Since what is necessary is just to be able to shield the incidence light which passes through the nucleus region 134, the respective shielding layers 190 are arranged so as to shift to the central view area 451 side in the peripheral view area 452. Namely, the center of the respective nucleus region formation portions 114 is not coincided with the center of the respective shielding layers 190.

Thus, the shielding layer 190 does not necessarily need to overlap with the nucleus region formation portion 114, if the shielding layer 190 can shield the nucleus region formation portion 114 substantially.

The above-described liquid crystal shutters 100m, 100n, 100o, and 100p are applicable to the liquid crystal shutter glasses 2, 2a, and 2b.

In the liquid crystal shutter glasses 2, 2a, and 2b used for the display system 1, when seeing three-dimensional imagery, as described above, the first shutter portion 101 and the second shutter portion 102 are switched by turns, and operate the change of the transmissive state and the shielding state by turns, however, when seeing a two-dimensional imagery, the first shutter portion 101 and the second shutter portion 102 are always maintained in the transmissive state. For example, in synchronizing with the display state of the display unit 3, the first shutter portion 101 and the second shutter portion 102 always maintain the transmissive state in the case of the two-dimensional image display, and in the case of a three-dimensional image display, the first shutter portion 101 and the second shutter portion 102 are driven so that the shutters switch between a transmissive state and a shielding state by turns.

When the liquid crystal shutter according this embodiment is applied to the liquid crystal shutter glasses 2, 2a, and 2b used for the display system 1, the response time (time required for the change between the transmissive state and the shielding state) of the liquid crystal shutter is set to be substantially equal to or shorter than the time of change of the picture of the display unit 3. In the case that either one of the first shutter portion 101 or the second shutter portion 102 turns to the transmit state in each field, it may result in the cross-talk problem of the right and left parallax images. For preventing this cross-talk problem, it may be preferable to insert the period during each field where both of the first shutter portion 101 and the second shutter portion 102 turn to the shielding state simultaneously. Accordingly, the three-dimensional display can be carried out without reducing the display quality.

Moreover, since the liquid crystal shutter according the embodiment of the present invention can set the shutters in a uniform transmissive state at the time of power supply OFF, the first shutter portion 101 and the second shutter portion 102 can be also used in the state of power supply OFF.

Although in the embodiment, an active matrix liquid crystal display capable of operating in the OCB mode is used as the display unit 3, the display unit 3 is not limited to the OCB mode. The display unit 3 at large which has a high-speed response can be used in the display system 1. For example, an organic electroluminescence display and a plasma display, etc. may be used as the display unit 3.

Although the liquid crystal shutter explained in the above embodiments is, as an example, used for the liquid crystal shutter glasses 2, 2a, and 2b of the display system 1 in which the three-dimensional display is possible, the liquid crystal shutter according to the present invention is not limited to this application. The shutters may be also applied to other products, such as a window pane, a showcase, a water tank and a pair of sunglasses.

In the above embodiments, the transition at the time of transferring to the splay alignment state from the bend alignment state can be promoted by controlling the transition. Thereby a high quality liquid crystal shutter which can suppress unevenness is obtained.

The present invention is not limited directly to the above described embodiments. In practice, the structural elements can be modified without departing from the spirit of the invention. Various inventions can be made by properly combining the structural elements disclosed in the embodiments. For example, some structural elements may be omitted from all the structural elements disclosed in the embodiments. Furthermore, structural elements in different embodiments may properly be combined. It is to therefore be understood that within the scope of the appended claims, the present invention may be practiced other than as specifically disclosed.

What is claimed is:

1. A liquid crystal shutter comprising:
    a first support substrate having a first electrode entirely and integrally formed thereon;
    a second support substrate having a second electrode entirely and integrally formed thereon so as to oppose to the first electrode;
    a liquid crystal layer sandwiched between the first and second electrodes and having a switching region and a plurality of nucleus regions surrounded with the switching region; the switching region becoming a bend alignment state from a splay alignment state by applying a voltage; and
    a plurality of nucleus region formation portions arranged on the first support substrate to form the nucleus regions in the liquid crystal layer, wherein the splay alignment in the nucleus regions is more stable than in the switching region.

2. The liquid crystal shutter according to claim 1, wherein the nucleus region formation portion is made of an aperture formed in the first electrode.

3. The liquid crystal shutter according to claim 2, wherein the aperture penetrates in the first electrode to the first support substrate.

4. The liquid crystal shutter according to claim 2, wherein the aperture is filled with an insulating material.

5. The liquid crystal shutter according to claim 1, wherein the nucleus region formation portion is formed of an insulating protrusion arranged on the first electrode.

6. The liquid crystal shutter according to claim 1, wherein the nucleus region formation portion is formed of an insulating protrusion arranged on the first support substrate and covered with the first electrode.

7. A liquid crystal shutter comprising:
a first support substrate having a first electrode entirely and integrally formed thereon;
a second support substrate having a second electrode entirely and integrally formed thereon so as to oppose to the first electrode;
a liquid crystal layer sandwiched between the first and second electrodes and having a switching region and a plurality of nucleus regions surrounded with the switching region; the switching region becoming a splay alignment state upon receiving a first voltage, and a bend alignment state upon receiving a second voltage larger than the first voltage between the first and second electrodes; and
a plurality of nucleus region formation portions arranged on the first support substrate to form the nucleus regions in the liquid crystal layer, wherein the splay alignment in the nucleus regions is more stable than in the switching region.

8. The liquid crystal shutter according to claim 7, wherein the liquid crystal layer in the nucleus region maintains the splay alignment state when the second voltage is applied between the first and second electrodes.

9. The liquid crystal shutter according to claim 7, wherein the voltage applied to the liquid crystal layer in the nucleus region is smaller than that in the switching region when the second voltage is applied between the first and second electrodes.

10. A liquid crystal shutter comprising:
a first support substrate having a first electrode entirely and integrally formed thereon;
a second support substrate having a second electrode entirely and integrally formed thereon so as to oppose to the first electrode;
a liquid crystal layer sandwiched between the first and second electrodes and having a switching region and a plurality of nucleus regions surrounded with the switching region; the switching region becoming a bend alignment state from a splay alignment state upon receiving a voltage larger than a threshold voltage between the first and second electrodes; and
a plurality of nucleus region formation portions arranged on the first support substrate to form the nucleus regions in the liquid crystal layer, wherein the splay alignment in the nucleus regions is more stable than in the switching region.

11. The liquid crystal shutter according to claim 10, wherein the nucleus region formation portion is made of an aperture formed in the first electrode.

12. The liquid crystal shutter according to claim 11, wherein the aperture penetrates in the first electrode to the first support substrate.

13. The liquid crystal shutter according to claim 11, wherein the aperture is filled with an insulating material.

14. The liquid crystal shutter according to claim 10, wherein the nucleus region formation portion is formed of an insulating protrusion arranged on the first electrode.

15. The liquid crystal shutter according to claim 10 wherein the nucleus region formation portion is formed of an insulating protrusion arranged on the first support substrate and covered with the first electrode.

16. The liquid crystal shutter according to claim 10;
wherein the first support substrate includes first and second alignment films arranged on the first electrode opposing to the second electrode to align the liquid crystal layer, and alignment characteristic of the first and second alignment films are different from each other, and
wherein the first alignment film is for the switching region and the
second alignment film is for the nucleus region as the nucleus region formation portion.

17. The liquid crystal shutter according to claim 16, wherein an absolute value of pre-tilt angle contacting with the liquid crystal layer at the second alignment film is smaller than that at the first alignment film.

18. The liquid crystal shutter according to claim 16, wherein alignment regulation force by the second alignment film is stronger than that of the first alignment film.

19. The liquid crystal shutter according to claim 10 further comprising a shielding layer to shield the nucleus formation portion formed on at least one of the first and second support substrates.

20. The liquid crystal shutter according to claim 19, wherein the first support substrate includes the shielding layer made from metal and the potential of the shielding layer is set to the same potential as that of the second electrode.

* * * * *